United States Patent
Reichert et al.

(10) Patent No.: US 12,359,070 B2
(45) Date of Patent: *Jul. 15, 2025

(54) NAPHTHALOCYANINE AND PHTHALOCYANINE CHROMOPHORES

(71) Applicant: BASF SE, Ludwigshafen am Rhein (DE)

(72) Inventors: Hans Reichert, Basel (CH); Rene Fischer, Basel (CH); Marie-Pascale Perritaz, Schweizerhalle (CH); Helmut Reichelt, Ludwigshafen am Rhein (DE); Oliver Seeger, Ludwigshafen am Rhein (DE); Korinna Dormann, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 996 days.

This patent is subject to a terminal disclaimer.

(21) Appl. No.: 17/430,150

(22) PCT Filed: Feb. 10, 2020

(86) PCT No.: PCT/EP2020/053342
§ 371 (c)(1),
(2) Date: Aug. 11, 2021

(87) PCT Pub. No.: WO2020/165099
PCT Pub. Date: Aug. 20, 2020

(65) Prior Publication Data
US 2022/0098413 A1    Mar. 31, 2022

(30) Foreign Application Priority Data
Feb. 12, 2019 (EP) ..................... 19156571

(51) Int. Cl.
| | |
|---|---|
| C09B 47/067 | (2006.01) |
| B41M 3/14 | (2006.01) |
| C09B 69/10 | (2006.01) |
| C09D 11/328 | (2014.01) |
| G02B 5/22 | (2006.01) |

(52) U.S. Cl.
CPC ............ *C09B 47/067* (2013.01); *B41M 3/14* (2013.01); *C09B 69/108* (2013.01); *C09D 11/328* (2013.01); *G02B 5/223* (2013.01)

(58) Field of Classification Search
CPC ...... C09B 47/067; C09B 69/108; B41M 3/14; C09D 11/328; G02B 5/223
See application file for complete search history.

(56) References Cited

U.S. PATENT DOCUMENTS

| | | |
|---|---|---|
| 6,340,745 B1 | 1/2002 | Meyer et al. |
| 7,671,194 B2 | 3/2010 | Indusegaram et al. |
| 2006/0030638 A1* | 2/2006 | Vonwiller ............... C09D 11/32 523/160 |
| 2008/0241492 A1 | 10/2008 | Demartin et al. |
| 2009/0043108 A1 | 2/2009 | Indusegaram et al. |
| 2019/0382429 A1 | 12/2019 | Olubummo et al. |

(Continued)

FOREIGN PATENT DOCUMENTS

| | | |
|---|---|---|
| RU | 96115332 A | 10/1998 |
| RU | 2278120 C2 | 6/2006 |
| WO | 2006/015414 A1 | 2/2006 |

(Continued)

OTHER PUBLICATIONS

International Preliminary Report on Patentability received for PCT Patent Application No. PCT/EP2020/053342, mailed on Aug. 26, 2021, 7 pages.

(Continued)

*Primary Examiner* — Jeffrey H Murray
*Assistant Examiner* — Daniel John Burkett
(74) *Attorney, Agent, or Firm* — Faegre Drinker Biddle & Reath LLP

(57) ABSTRACT

The present invention relates to naphthalocyanine and phthalocyanine chromophores of formula (I), their use as almost colourless IR absorbers, for optical filter applications, especially for plasma display panels, or for laser welding of plastics. The compounds may be used in compositions for inks, paints and plastics, especially in a wide variety of printing systems and are particularly well-suited for security applications.

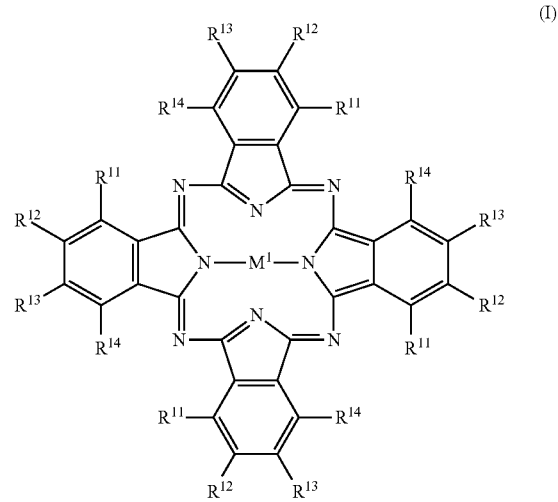

15 Claims, 2 Drawing Sheets

(56) References Cited

U.S. PATENT DOCUMENTS

2023/0295439 A1* 9/2023 Leybach ............. C09B 47/0675
                                                           524/88

FOREIGN PATENT DOCUMENTS

| WO | 2008/006136 | A1 |   | 1/2008 |           |
|----|-------------|----|---|--------|-----------|
| WO | 2009/012514 | A1 |   | 1/2009 |           |
| WO | 2009/100239 | A2 |   | 8/2009 |           |
| WO | 2015/130401 | A2 |   | 9/2015 |           |
| WO | WO-2015169701 | A1 | * | 11/2015 | ........... C07D 487/22 |
| WO | 2016/193237 | A1 |   | 12/2016 |          |
| WO | 2019/245516 | A1 |   | 12/2019 |          |
| WO | 2019/245517 | A1 |   | 12/2019 |          |
| WO | 2019/245518 | A1 |   | 12/2019 |          |
| WO | 2019/245534 | A1 |   | 12/2019 |          |
| WO | 2019/245535 | A1 |   | 12/2019 |          |
| WO | 2019/245589 | A1 |   | 12/2019 |          |
| WO | 2020/005200 | A1 |   | 1/2020 |           |

OTHER PUBLICATIONS

Papulov, Yu. G., "Relationship of Properties of Substances with the Structure of Molecules: Mathematical Modeling", Advances in Modern Natural Science, No. 2, 2006, pp. 75-76 (p. 75, right column, lines 1-4 from the bottom, p. 76, left column, lines 1-5 from above).

International Search Report and Written Opinion received for PCT Patent Application No. PCT/EP2020/053342, mailed on Mar. 30, 2020, 8 pages.

* cited by examiner

NAPHTHALOCYANINE AND PHTHALOCYANINE CHROMOPHORES

CROSS-REFERENCE TO RELATED APPLICATIONS

This application is a national stage application (under 35 U.S.C. § 371) of PCT/EP2020/053342, filed Feb. 10, 2020, which claims benefit of European Application No. 19156571.2, filed Feb. 12, 2019, both of which are incorporated herein by reference in their entirety.

The present invention relates to naphthalocyanine and phthalocyanine chromophores of formula (I), their use as almost colourless IR absorbers, for optical filter applications, especially for plasma display panels, or for laser welding of plastics. The compounds may be used in compositions for inks, paints and plastics, especially in a wide variety of printing systems and are particularly well-suited for security applications.

DESCRIPTION OF THE RELATED ART

Colourless, or at least barely coloured, IR absorbers meet a significant technical need in a wide range of applications, such as security printing (bank notes, credit cards, identity cards, passports etc.), invisible and/or IR readable bar codes, the laser-welding of plastics, the curing of surface-coatings using IR radiators, the drying and curing of print, the fixing of toners on paper or plastics, optical filters for PDPs (plasma display panels), laser marking e.g. of paper or plastics, the heating of plastic preforms, heat shielding applications, etc.

A large number of organic and inorganic substances belonging to different compound classes and with a great variety of different structures are known for the application as IR absorbers. Notwithstanding that large numbers of known compound classes and structures with a complex profile of properties often presents difficulties, there is a continuing demand for IR absorbers that are "colourless" (i.e. with the minimum possible inherent colour), and that simultaneously meet the technical stability requirements (chemical stability, heat stability and/or light stability).

A special field of application for colourless IR absorbers regards inks for printing processes which are used for printing currency and other security documents, also referred to as "security printing". Typical security printing processes are processes, wherein an ink composition is employed that is designed to selectively absorb radiation in parts of the "optical infrared" spectrum, whilst being transparent in other parts of it. IR absorbers for security printing are available, for example, from "American Dye Source", but virtually all of them have a noticeable absorption in the visible (VIS) range of the spectrum (from 400 to 700 nm).

WO2006/015414 describes IR-absorbing naphthalocyanine compounds for security printing. These compounds may have different axial substituents and a variety of central atoms.

WO2006/015414 describes IR-absorbing naphthalocyanine compounds.

WO2008/006136 (US2009043108) discloses a specific Ga naphthalocyanine compound with an ethylenoxide derived axial substituent. These types of substituents render the compounds more watersoluble.

WO2009/012514 discloses a further specific Ga naphthalocyanine compound with a $C_{16}$alkyl axial substituent which may impart more oil solubility to the compound.

WO2009/100239 discloses the synthesis of the following phthalocyanine compounds:

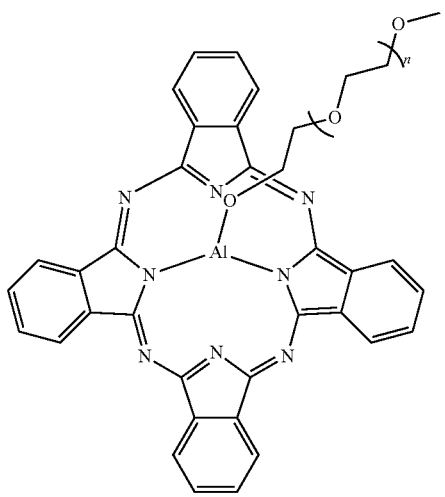

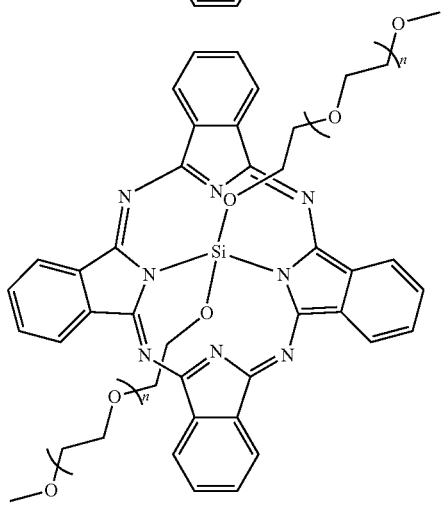

WO2015/169701 relates to Ga-naphthalocyanine chromophores with of formula

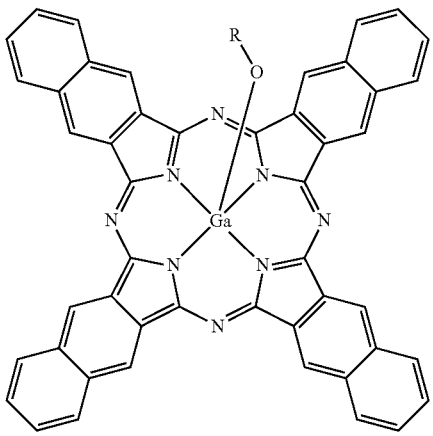

wherein R is $C_1$-$C_6$alkyl, their use as almost colourless IR absorbers, for optical filter applications, especially for plasma display panels, or for laser welding of plastics.

WO2016/193237 relates to the use of naphthalocyanine chromophores of formula

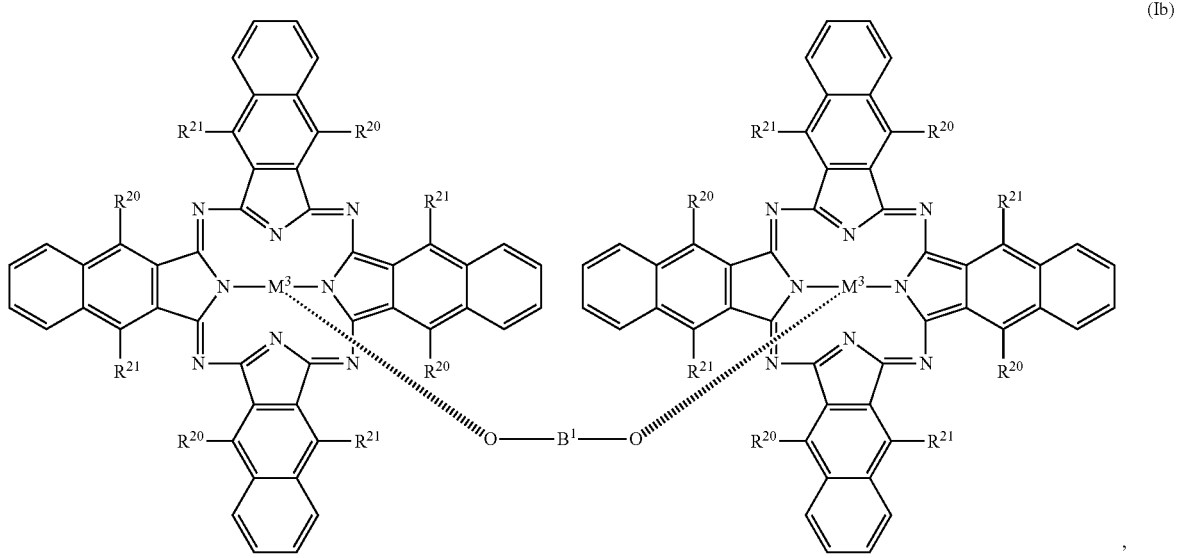

(Ib)

wherein
X is OH, O(C$_2$H$_4$O)$_n$CH$_3$, OC$_8$-C$_{18}$alkyl, OSi(n-C$_1$-C$_{12}$alkyl)$_3$;
n is an integer from 1 to 6;
M$^2$, M$^3$ are Ga;
B$^1$ in formula (Ib) is C$_1$-C$_{12}$alkylene, C$_1$-C$_{12}$alkylene which is interrupted by one or more oxygen atoms or C$_1$-C$_{12}$alkylene which is substituted by at least one OH group;
R$^{20}$ and R$^{21}$ are independently of each other H, F, OR$^{16}$, SR$^{16}$, NHR$^{11}$, or NR$^{17}$R$^{17'}$;
R$^{16}$ is C$_1$-C$_{12}$alkyl, (C$_2$H$_4$O)$_n$OR$^{18}$, or phenyl;
R$^{18}$ is C$_1$-C$_{12}$alkyl;
R$^{17}$ and R$^{17'}$ are independently of each other C$_1$-C$_{12}$alkyl, (C$_2$H$_4$O)$_n$OR$^{18}$, or phenyl; or
R$^{17}$ and R$^{17'}$ together may represent a 5- or 6-membered aliphatic ring, wherein one C-atom in the ring may be replaced by oxygen, to form a pyrrolidine, piperidine, 2-methylpiperidine or morpholine radical; as almost colourless IR absorbers for security printing applications

DESCRIPTION OF THE INVENTION

The objective of the instant invention is to provide Ga/Al (na)phthalocyanine compounds with a tailor-made high combability with the application medium and allowing further chemical modification by simple chemical steps. The light stability and heat stability should be as high as possible. The advantageous absorbing properties should thereby not adversely be affected. In the area of pigments proper particle size, shape and particle size distribution have an impact on the so-called secondary properties like light-, heat- and chemical fastnesses. This is achieved by pigment finishing with physical methods. Tailor made selection of axial substituents and their straightforward introduction facilitates the important step of ripening, i.e. defined crystal growth by means of a solvent of similar chemical nature. Without proper ripening, narrow and uniform particle size distribution can't be achieved in a kneading procedure. Due to the built-in functionalities of the introduced axial substituents, further chemical modification can be easily achieved.

The problem has been solved by providing the compounds of formula (I) substituted with an axial substituent bearing a hydroxy, or amino end group. The compounds exhibit high thermal and light fastness, high resistance against chemicals and solvents without losing their other advantages like colourlessness. They can be advantageously employed as IR absorbers for security printing and the laser-welding of plastics. Due to their unique application properties they are in particular suitable as IR absorbers for security printing, especially for bank notes.

In a first aspect, the invention relates to compounds of formula

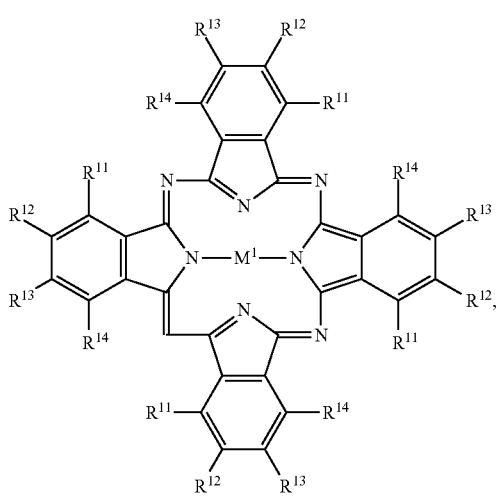

(I)

wherein
M$^1$ is Al(R$^{15}$), or Ga(R$^{15}$),
R$^{15}$ is OR$^{16}$;
R$^{11}$ and R$^{14}$ are independently of each other H, F, OR$^{17''}$, SR$^{17''}$, or NR$^{17}$R$^{17'}$, $R^{12}$ and $R^{13}$ are independently of each other H, F, $OR^{17"}$, $SR^{17"}$, $NHR^{17}$, or $NR^{17}R^{17'}$, or $R^{12}$ and $R^{13}$ together with the C atoms to which they are bonded form a 6-membered aromatic ring, which may optionally be substituted;

$R^{16}$ is a group of formula

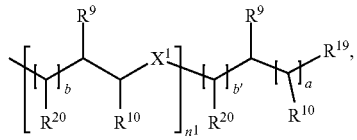
(Va)

especially $(CH_2CH_2O)_{n1}CH_2CH_2R^{19}$, $(CH_2CH(CH_3)O)_{n1}CH_2CH(CH_3)R^{19}$, $(CH_2CH_2CH_2O)_{n2}CH_2CH_2CH_2R^{19}$, or $(CH_2CH_2NH)_{n3}CH_2CH_2R^{19}$;

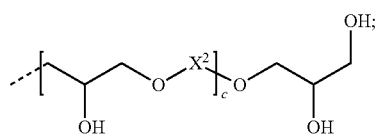
(Vb)

especially

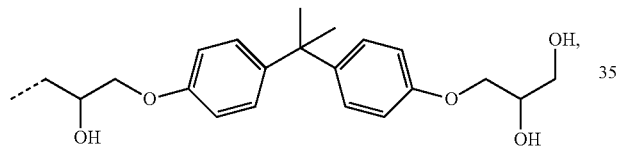

or $CH_2CH(OH)CH_2OH$; or

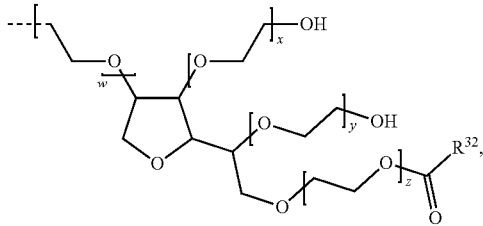
(Vc)

especially a group of formula (Vc), wherein w+x+y+z=20 and $R^{32}$ is $(CH_2)_{10}CH_3$, $(CH_2)_{12}CH_3$, $(CH_2)_{14}CH_3$ and $(CH_2)_{16}CH_3$;

$X^1$ is O, S or NH, $X^2$ is

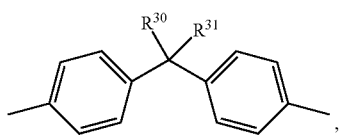

w+x+y+z=4 to 20;

$R^9$ and $R^{10}$ are the same or different and are each independently hydrogen, or a methyl group;

$R^{17}$, $R^{17'}$ and $R^{17"}$ are independently of each other a $C_1$-$C_{12}$alkyl group, $(CH_2CH_2O)_nOR^{18}$, or phenyl; or $R^{17}$ and $R^{17'}$ together with the C atoms to which they are bonded form a saturated 5- or 6-membered N-heterocyclic ring, which is optionally substituted by 1 or 2 methyl groups;

$R^{18}$ is a $C_1$-$C_{12}$alkyl group;

$R^{19}$ is OH, or $NH_2$;

$R^{20}$ is H, or a $C_1$-$C_4$alkyl group;

$R^{30}$ and $R^{31}$ are independently of each other hydrogen, or a $C_1$-$C_4$alkyl group; or $R^{30}$ and $R^{31}$ form a five, or six-membered ring, which may optionally be substituted, $R^{32}$ is a $C_1$-$C_{25}$alkyl group, or a $C_2$-$C_{25}$alkenyl group, a is 0, or 1; b is 0, or 1; b' is 0, or 1; c is 1;

n is 0, 1, 2, 3 or 4; and n1 is 0, or a value from 1 to 10; n2 is 0, or a value from 1 to 10; n3 is a value from 1 to 10.

The compounds of formula (I) may be used as colourless IR absorber, for optical filter applications, especially for plasma display panels, laser marking, or for laser welding of plastics.

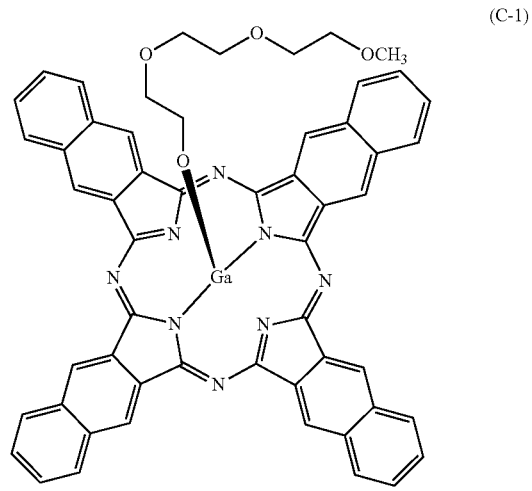
(C-1)

Figure 1:
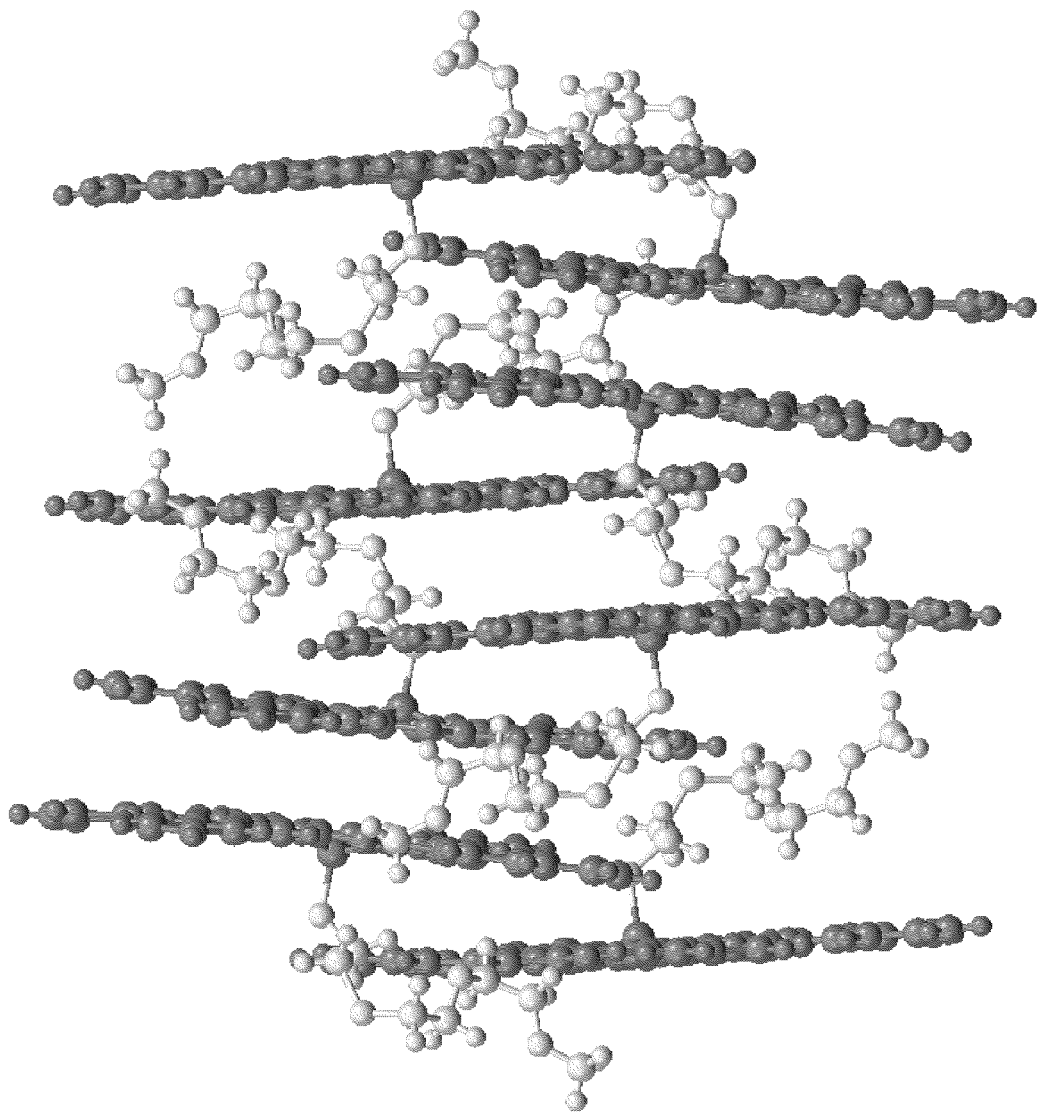
FIG. 1: Molecular Structure of the compound described in Example 6 of U.S. Pat. No. 7,671,194 (cpd. C-1) determined by single crystal X-ray structure analysis.
Figure 2:
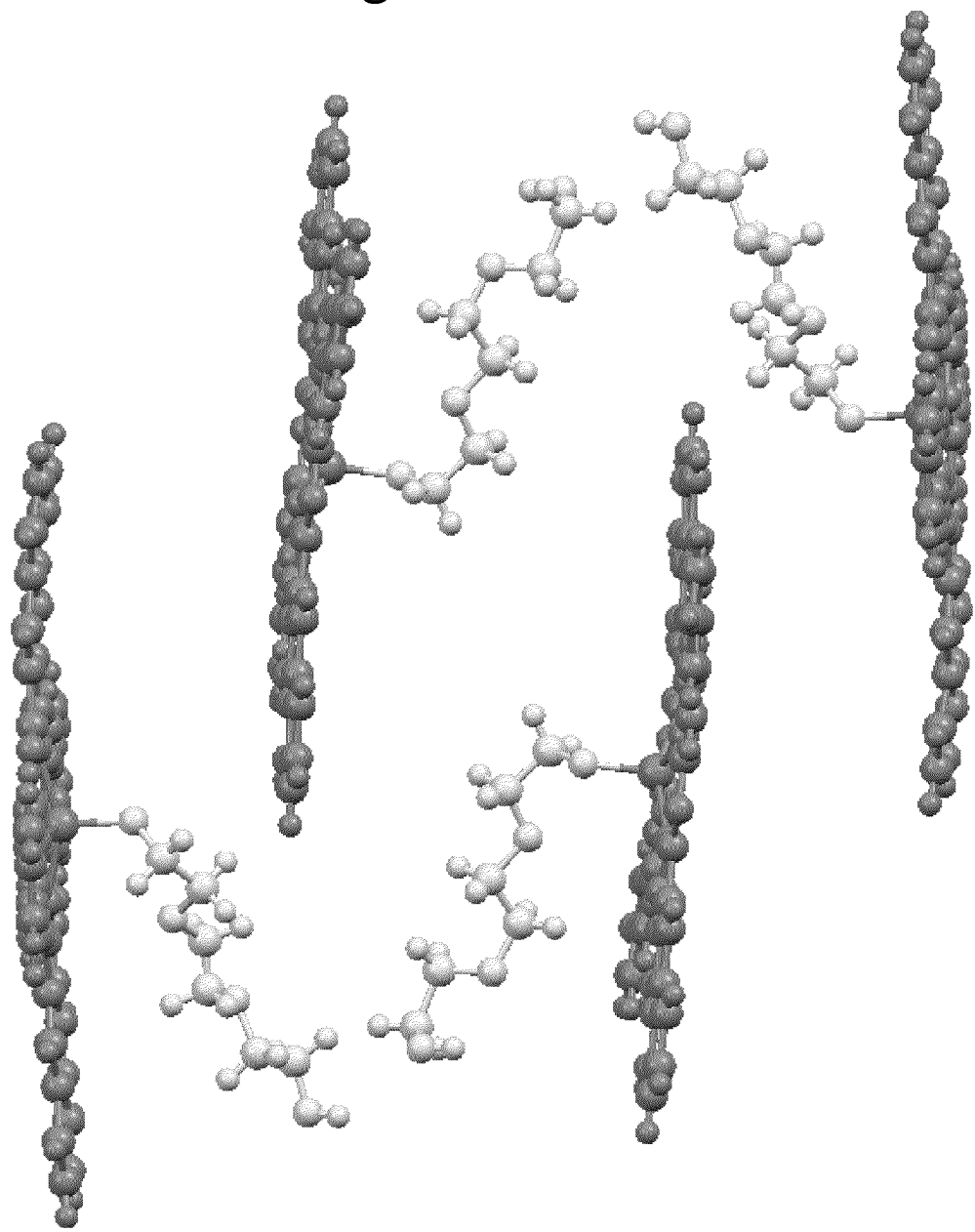

FIG. 2: Molecular Structure of compound 1c determined by single crystal X-ray structure analysis.

Due to the replacement of $OCH_3$ by OH hydrogen bonds are formed in case of compound 1c resulting in lower packing density and in turn higher absorbing efficiency of compound 1c without compromising on stability in comparison with compound C-1.

In a preferred embodiment $R^{12}$ and $R^{13}$ in formula (I) (and (Ia) are independently of each other H, $OR^{17"}$, or $NHR^{17}$, in particular H, or $OR^{17"}$. In said embodiment $R^{12}$ and $R^{13}$ have preferably the same meaning.

In another preferred embodiment $R^{12}$ and $R^{13}$ together with the C atoms to which they are bonded form a 6-membered aromatic ring, which may optionally be substituted, such as

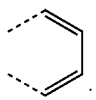

The compound of formula (I) is preferably a compound of formula

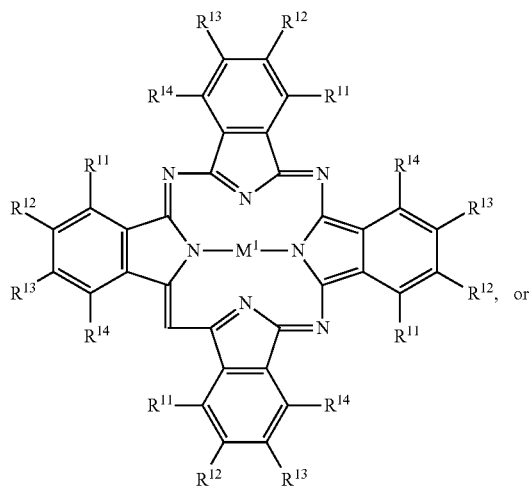

(Ia)

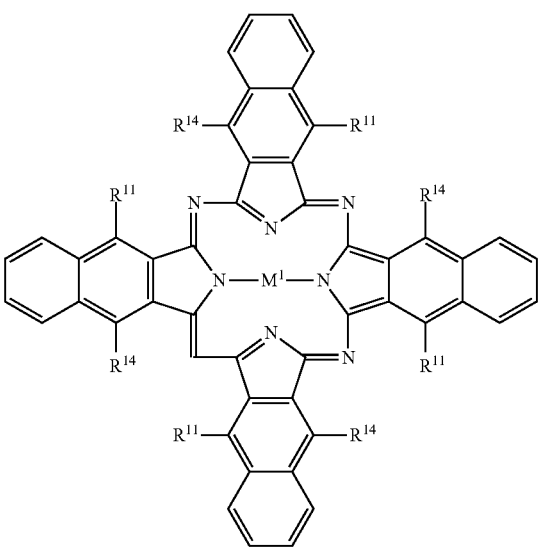

(Ib)

wherein $R^{12}$ and $R^{13}$ are independently of each other H, F, $OR^{17''}$, $SR^{17''}$, $NHR^{17}$, or $NR^{17}R^{17'}$, and $M^1$, $R^{11}$, $R^{14}$, $R^{17}$, $R^{17'}$ and $R^{17''}$ are defined above, or below.

Preferably, the radicals $R^1$ and $R^{14}$ in formula (I) are independently of each other H, $OR^{17''}$, or $NHR^{17}$, in particular H, or $OR^{17''}$.

According to a preferred embodiment of the invention the radicals $R^{11}$ and $R^{14}$ have the same meaning.

The groups $R^{17}$, $R^{17'}$, $R^{17''}$ and n have the following preferred meanings:

$R^{17''}$ is $C_1$-$C_8$alkyl, or $(C_2H_4O)_nR^{18}$, in particular $(C_2H_4O)_nR^{18}$;

$R^{17}$ and $R^{17'}$ are independently of each other $C_1$-$C_8$alkyl, or $(C_2H_4O)_nR^{18}$, more preferably $C_1$-$C_6$alkyl, or $(C_2H_4O)_nR^{18}$, or $R^{17}$ and $R^{17'}$ together form a 5- or 6-membered saturated N-heterocyclic ring, such as, for example, a pyrrolidine, a piperidine, a 2-methylpiperidine, or a morpholine ring;

$R^{18}$ is $C_1$-$C_8$-alkyl, in particular $C_1$-$C_6$-alkyl;

n is 1, 2 or 3, in particular 2 or 3.

In the compound of formula (Ib) $R^{11}$ and $R^{14}$ are preferably H.

In the compound of formula (Ia) $R^{11}$, $R^{12}$, $R^3$ and $R^{14}$ are H.

$M^1$ is preferably $Ga(R^{15})$.

In a preferred embodiment $R^{16}$ is a group of formula

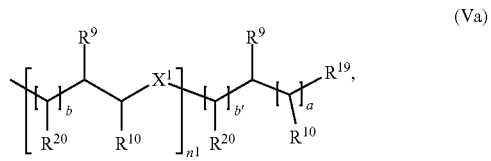

(Va)

wherein $X^1$ is O, S or NH;

$R^{21}$ is hydrogen, or a $C_1$-$C_4$alkyl group;

$R^9$ and $R^{10}$ are the same or different and are each independently hydrogen, or a methyl group;

$R^{19}$ is OH, or $NH_2$;

a is 0, or 1; b is 0, or 1; b' is 0, or 1; and n1 is 0, or a value from 1 to 10.

It should be noted that, for example, units with identical or different $R^9$; $R^{10}$ and $R^{20}$ groups occur, in which case units with different substitution, i.e. propylene oxide- and/or ethylene oxide-based, are present in any sequence and repetition in the particular group.

In said embodiment groups of formula $(CH_2CH_2O)_{n1}CH_2CH_2R^{11}$, $(CH_2CH(CH_3)O)_{n1}CH_2CH(CH_3)R^{19}$, $(CH_2CH_2CH_2O)_{n2}CH_2CH_2CH_2R^{19}$ and $(CH_2CH_2NH)_{n3}CH_2CH_2R^{19}$ are preferred and groups of formula $(CH_2CH_2O)_{n1}CH_2CH_2R^{19}$ and $(CH_2CH(CH_3)O)_{n1}CH_2CH(CH_3)R^{19}$ are most preferred.

n1 is 0, or a value from 1 to 10; especially 1 to 4.

n2 is 0, or a value from 1 to 10; especially 1 to 4.

n3 is a value from 1 to 10, especially 1 to 4.

$R^{20}$ is preferably H. $R^{19}$ is preferably OH.

Examples of compounds of formula (I), wherein $R^{16}$ is a group of formula (Va), are compounds 1a to 1g, 1l, 2a to 2g, 2l, 3a to 3g, 3l, 4a to 4g and 4l listed in claim 5, wherein compounds 1a to 1f are preferred.

In another preferred embodiment $R^{16}$ is a group of formula

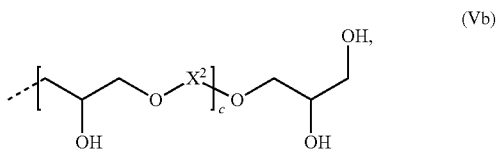

(Vb)

wherein c is 0, or 1 and $X^2$ is a group of formula

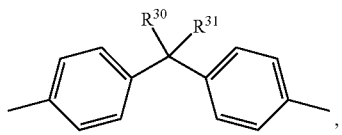

especially a group of formula

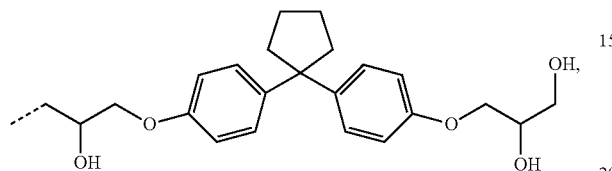

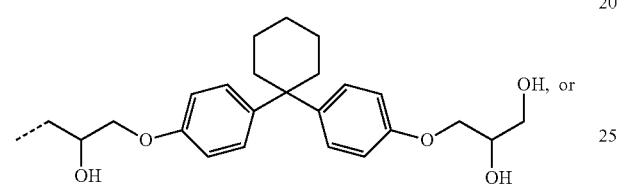

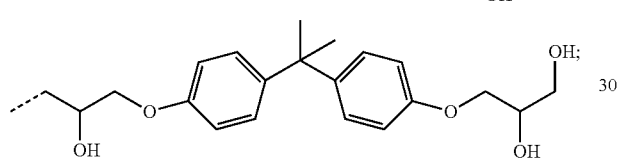

or $CH_2CH(OH)CH_2OH$.

Examples of compounds of formula (I), wherein $R^{16}$ is a group of formula (Vb), are compounds 1h and 1j, 2h and 2j, 3h and 3j and 4h and 4j listed in claim 5, wherein compound 1h and 1j are preferred. Said compounds have high compatibility with polycarbonates.

In another preferred embodiment $R^{16}$ is a group of formula (Vc)

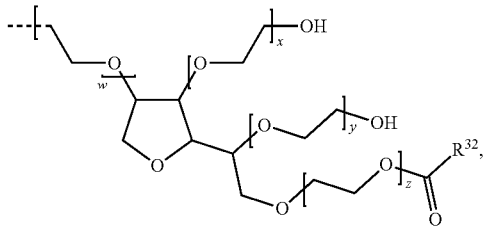

wherein w+x+y+z=4 to 20 and $R^{32}$ is a $C_1$-$C_{25}$alkyl group, or a $C_2$-$C_{25}$alkenylgroup; especially a group of formula (Vc), wherein w+x+y+z=20 and $R^{32}$ is $(CH_2)_{10}CH_3$, $(CH_2)_{12}CH_3$, $(CH_2)_{14}CH_3$ and $(CH_2)_{16}CH_3$. Said compounds are highly compatible with aqueous systems. Structure (Vc) given above is an idealized representation of the group bonded to the oxygen atom of the gallium, or aluminium atom. In principle, three bonding possibilities of the group to the oxygen atom of the gallium, or aluminium atom exist:

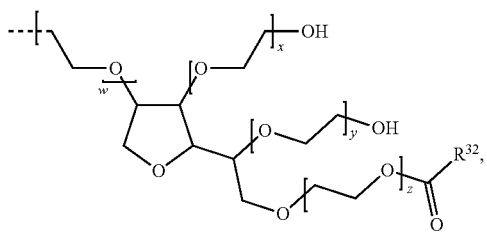

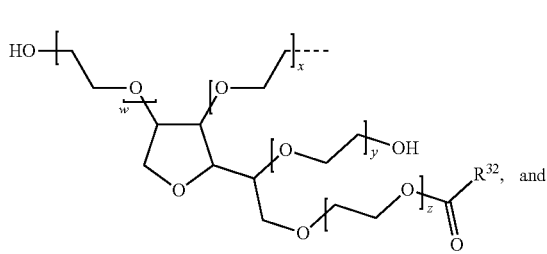

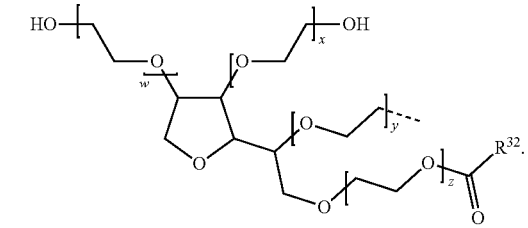

Examples of compounds of formula (I), wherein $R^{16}$ is a group of formula (Vc), are compounds 1i, 1k, 2i, 2k, 3i, 3k, 4i and 4k listed in claim 5, wherein compound 1i is preferred.

The process for the production of a compound of formula (I')

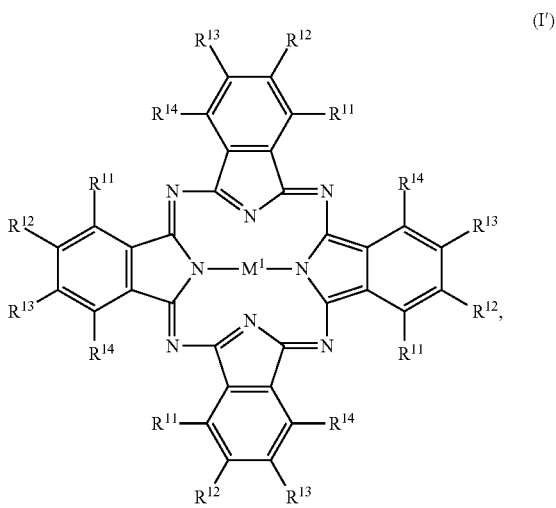

comprises
a) providing a suspension of a compound of formula

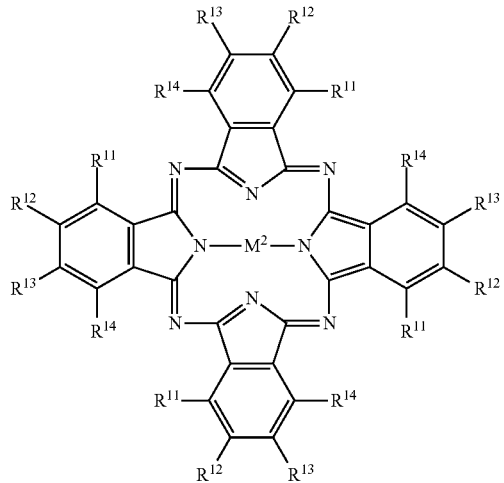

(II)

in a compound of formula HOR$^{16}$ (III);
b) reacting the compound of formula (II) with the compound of formula (III) to obtain a compound of formula (I'); wherein
M$^1$ is Al(R$^{15}$), or Ga(R$^{15}$),
R$^{15}$ is OR$^{16}$, R$^{16}$ is defined above, or is a C$_1$-C$_{25}$alkyl group;
R$^{11}$, R$^{12}$, R$^{13}$ and R$^{14}$ are defined above, or below;
M$^2$ is Al(R$^{25}$), or Ga(R$^{21}$),
R$^{25}$ is OR$^{26}$;
R$^{26}$ is C$_1$-C$_{25}$alkyl, (CH$_2$CH(R$^{20}$)O)$_{n4}$CH$_2$CH$_2$R$^{29}$, (CH$_2$CH$_2$CH$_2$O)$_{n5}$CH$_2$CH$_2$CH$_2$R$^{29}$, CH$_2$CH(OH)CH$_2$OH, or (CH$_2$CH$_2$NH)$_{n6}$CH$_2$CH$_2$R$^{29}$; (CH$_2$CH$_2$O)$_{n4}$CH$_2$CH$_2$R$^{29}$, (CH$_2$CH(CH$_3$)O)$_{n4}$CH$_2$CH(CH$_3$)R$^{29}$, (CH$_2$CH$_2$CH$_2$O)$_{n5}$CH$_2$CH$_2$CH$_2$R$^{29}$, or (CH$_2$CH$_2$NH)$_{n6}$CH$_2$CH$_2$R$^{29}$;
R$^{20}$ is defined above;
R$^{29}$ is OR$^{30}$,
R$^{30}$ is a C$_1$-C$_{12}$alkyl group,
n4, n5 and n6 are 0, 1, 2, 3 or 4; with the proviso that in case R$^{16}$ is a C$_1$-C$_{25}$alkyl group,
R$^{16}$ and R$^{26}$ have different meanings.

M$^2$ is preferably Ga(R$^{25}$), wherein R$^{25}$ is OR$^{26}$. R$^{26}$ is especially (CH$_2$CH(R$^{20}$)O)$_{n4}$CH$_2$CH$_2$R$^{29}$ and (CH$_2$CH$_2$CH$_2$O)$_{n5}$CH$_2$CH$_2$CH$_2$R$^{29}$, very especially (CH$_2$CH(R$^{20}$)O)$_{n4}$CH$_2$CH$_2$R$^{29}$. R$^{20}$ is especially H, or a methyl group, very especially H. R$^{29}$ is OR$^{30}$, wherein R$^{30}$ is especially a C$_1$-C$_4$alkyl group, very especially a methyl group.

For R$^{11}$, R$^{12}$, R$^{13}$ and R$^{14}$ in the compounds of formula (II) the same preferences apply as in case of the compounds of formula (I). R$^{11}$, R$^{12}$, R$^{13}$ and R$^{14}$ are preferably H.

The term "suspension" covers any composition comprising the compound of formula (II), which is not fully dissolved in the compound of formula (III).

By using compounds of formula (II) as starting materials, wherein R$^{26}$ is a C$_1$-C$_6$alkyl group, the obtained volatile C$_1$-C$_6$alkanols can be easily removed from the reaction mixture, whereby the reaction equilibrium is shifted towards the reaction product.

Step b) includes applying of shear forces to the suspension of the compound of formula (II) and the compound of formula (III) by stirring, kneading or any other mechanical treatment.

Stirring can be done at elevated temperature, especially at 40 to 170° C. for 0.5 to 48 h.

Kneading can be done with or without salt at a temperature of 20 to 170° C. for 0.5 to 48 h. Mixing by means of a paddle dryer or ball mill can also be applied.

Suitable inorganic salts are, in particular, for example, sodium chloride and sodium sulfate. Typically, technical-grade salts with or without preceding micronization are used.

IR absorbing compounds (II) that are suitable for the inventive process can be obtained e.g. from chemical synthesis or commercial sources having already an appropriate particle size distribution as well as a median particle diameter. In case the particles of the pigment to be used are too coarse, the particle size can be reduced by using established particle communication methods, including in particular communication techniques involving water or an organic solvent and grinding media like beads or inorganic salts. Suitable methods and devices are known and have been described e.g. in Perry's Chemical Engineers' Handbook, 7th ed. McGraw Hill 1997, 20-31 to 20-38, and the literature cited therein, and are commercially available, e.g. from Netzsch Feinmahltechnik, FHZ GmbH, Hosokawa-Alpine AG, Willy A. Bachofen AG Maschinenfabrik, Coperion and Bühler GmbH.

The present invention also relates to compositions, comprising the compounds of formula (I), especially of formula (Ia) and (Ib), wherein the compounds of formula (I), especially of formula (Ia) and (Ib), have a number average particle size in the range of from 10 nm to 1000 nm, preferably from 10 nm to 500 nm, more preferably 10 to 100 nm with standard deviation being less than 50%, especially less than 30%, very especially less than 20%. The particle size was measured with transmission electron microscopy (TEM).

TEM analysis of dispersions was performed on "Libra 120", an instrument from ZEISS in bright field mode at an electron beam acceleration voltage of 120 kV. The TEM was used with an energy filter for better contrast. At least 2 representative images with scale in different magnification were recorded in order to characterize the dominate particle morphology for each sample. The minimal feret diameter of the particles was determined with the software "ImageJ", which is based on the measurement of at least 4800 randomly selected particles.

The term "alkyl" relates to a linear or branched, saturated hydrocarbon radical having usually 1 to 25 carbon atoms, in particular 1 to 12 carbon atoms, frequently, 1 to 6 carbon atoms, in particular 1 to 4 carbon atoms, such as methyl, ethyl, n-propyl, isopropyl, n-butyl, 2-butyl, isobutyl, tert.-butyl, n-pentyl, 2-pentyl, 1,2-dimethylpropyl, 2,2-dimethylpropyl, n-hexyl, 2-hexyl, 2,3-dimethylbutyl, n-heptyl, 2-heptyl, n-octyl, 2 octyl, 2-ethylhexyl, 2,4,4-trimethylpentyl, n-nonyl, 2-nonyl, n-decyl, 2-decyl, n undecyl, 2-undecyl, n-dodecyl, 2-dodecyl and 2,4,4,6,6-pentamethyldecyl.

The term "alkenyl" relates to a linear or branched, unsaturated hydrocarbon radical having usually 2 to 25 carbon atoms, in particular 3 to 12 carbon atoms, frequently, 3 to 6 carbon atoms and bearing at least one ethylenically unsaturated double bond, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl or 2-methyl-2-propenyl; C$_2$-C$_6$-alkenyl, such as ethenyl, 1-propenyl, 2-propenyl, 1-methylethenyl, 1-butenyl, 2-butenyl, 3-butenyl, 1-methyl-1-properyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl and the like, or $C_2$-$C_8$-alkenyl, such as the radicals mentioned for $C_2$-$C_6$-alkenyl and additionally 1-heptenyl, 2-heptenyl, 3-heptenyl, 1-octenyl, 2-octenyl, 3-octenyl, 4-octenyl and the positional isomers thereof.

The laser welding is preferably carried out using a YAG laser or using a diode laser emitting within the absorption range of the aforementioned IR absorber of the formula (I). The concentration of the IR absorber of the formula (I) or of IR absorber mixtures is e.g. from 5 to 500 ppm, preferably from 10 to 200 ppm.

In laser welding, plastics components are welded to one another. The plastics components to be fused may have any shape. For example, at least one of the plastics components may be a film.

The compounds of formula (I) according to the invention are suitable for welding transparent at least translucent plastic materials. The employed plastic materials may be colourless or coloured. In principle, the plastic components to be fused may be composed of the same polymer or of different polymers. Preferably, the plastic components employed for laser welding are selected from thermoplastic polymers. However, it is also possible that neither of the plastic components to be fused is composed of thermoplastic; however, a coating of at least one part with a thermoplastic comprising the compound of the formula (I) is required.

The plastic components employed for laser welding preferably comprise or consist of at least one polymer selected from polyolefins, polyolefin copolymers, polytetrafluoroethylenes, ethylene-tetrafluoroethylene copolymers, polyvinyl chlorides, polyvinylidene chlorides, polyvinyl alcohols, polyvinyl esters, polyvinyl alkanals, polyvinyl ketals, polyamides, polyimides, polycarbonates, polycarbonate blends, polyesters, polyester blends, poly(meth)acrylates, poly(meth)acrylate-styrene copolymer blends, poly(meth)acrylatepolyvinylidene difluoride blends, polyurethanes, polystyrenes, styrene copolymers, polyethers, polyether ketones and polysulfones and mixtures thereof.

Preference is given to matrix polymers from the group of the polyolefins, polyolefin copolymers, polyvinyl alkanals, polyamides, polycarbonates, polycarbonate-polyester blends, polycarbonate-styrene copolymer blends, polyesters, polyester blends, poly(meth)acrylates, poly(meth)acrylate-styrene copolymer blends, poly(meth)acrylatepolyvinylidene difluoride blends, styrene copolymers and polysulfones and mixtures thereof.

Particularly preferred polymers are transparent or at least translucent. Examples include: polypropylene, polyvinylbutyral, nylon-[6], nylon-[6,6], polycarbonate, polycarbonate-polyethylene terephthalate blends, polycarbonate-polybutylene terephthalate blends, polycarbonale-acrylonitrile/styrene/acrylonitrile copolymer blends, polycarbonate-acrylonitrile/butadiene/styrene copolymer blends, polymethyl methacrylate-acrylonitrile/butadiene/styrene copolymer blends (MABS), polyethylene terephthalate, polybutylene terephthalate, polymethyl methacrylate, impact-modified polymethyl methacrylate, polybutyl acrylate, polymethyl methacrylate-polyvinylidene difluoride blends, acrylonitrile/butadiene/styrene copolymers (ABS), styrene/acrylonitrile copolymers (SAN), polyphenylenesulfone and mixtures comprising 2 or more (e.g. 2, 3, 4, 5) of the afore-mentioned polymers.

Suitable polymer preparations for laser welding comprise
A) a thermoplastic matrix polymer suitable for forming the plastics parts,
B) the compound of the formula (I) as defined before,
C) optionally at least one further additive.

Those polymer preparations for laser welding are likewise in accordance with the invention and are suitable for producing fusion-bonded plastic parts with the aid of laser radiation whose wavelength is outside the visible region.

Polymer preparations for laser welding may advantageously be produced by a conventional extrusion or kneading process. The components B), and, if present, C) may be mixed from the outset, in the weight ratio corresponding to the desired end concentration, with the matrix polymer A) (direct compounding), or a distinctly higher concentration of B) and, if present, C) may initially be selected and the concentrate formed (masterbatch) subsequently diluted with further matrix polymer A) in the course of the manufacture of the parts to be fused.

Suitable additives C) are UV stabilizers, antioxidants, processing plasticizers, etc.

In addition, the polymer preparations for laser welding may comprise at least one colorant for establishing a desired hue as additive, especially transparent organic pigments and in particular dyes, for example C.I. Pigment Yellow 138, 139, 147, 183, 185 192 and 196, C.I. Pigment Orange 70, C.I. Pigment Red 149, 178 and 179, 181, 263, C.I. Pigment Violet 19 and 29, C.I. Pigment Blue 15, 15:1, 15:3 and 15:4, C.I. Pigment Green 7 and 36, C.I. Solvent Yellow 14, 21, 93, 130, 133, 145, 163, C.I. Solvent Red 52, 135, 195, 213, 214 and 225, C.I. Solvent Blue 35, 45, 67, 68, 97, 104, 122, 132, C.I. Solvent Violet 13, 46, 49, C.I. Solvent Green 3, 5 and 28, C.I. Solvent Orange 47, 60, 86, 114, and 163, C.I. Solvent Brown 35, 53, and also C.I. Disperse Yellow 54, 87, 201, C.I. Disperse Orange 30, C.I. Disperse Red 60 and C.I. Disperse Violet 57

A further possible additive group is that of additives which likewise modify the visual appearance, the mechanical properties or else the tactile properties, for example matting agents, such as titanium dioxide, chalk, barium sulfate, zinc sulfide, fillers, such as nanoparticulate silicon dioxide, aluminium hydroxide, clay and other sheet silicates, glass fibers and glass spheres.

An especially suitable field of application is the use of the compound of formula (I) in security printing.

The compound of the general formula (I) has at least one of the following advantageous properties:
good fastness to chemicals, in particular fastness to bleaching with hypochlorite and fastness to solvents (like toluene, acetone or dichloromethane),
good fastness to boiling water,
good fastness to light,
almost colourless (i.e. minimal absorption in the VIS range of the spectrum (from 400 to 700 nm))
good heat stability,
high compatibility with a multiplicity of formulations, in particular printing ink formulations used especially in security printing.

The compound of general formula (I) can be used inter alia for security printing, invisible and/or IR readable bar codes, the laser-welding of plastics, the curing of surface-coatings using IR radiators, the drying and curing of print, the fixing of toners on paper or plastics, optical filters for plasma display panels, laser marking of paper or plastics, the heating of plastic preforms, 3D printing and for heat shielding applications.

Some examples of three-dimensional (3D) printing may utilize a fusing agent (including an energy absorber) to pattern polymeric build material. The fusing agent is capable of absorbing radiation and converting the absorbed radiation to thermal energy, which in turn coalesces/fuses the polymeric build material that is in contact with the fusing agent.

Accordingly, the present invention is directed to fusing agents, comprising a compound of formula (I), especially a compound of formula (Ia) and (Ib). The composition of the fusing agents is, for example, described in WO2020005200, WO2019245589, WO2019245518, WO2019245517, WO2019245535, WO2019245534, WO2019245516 and US2019382429.

In addition, the present invention is directed to a consumable material for use in an additive manufacturing system, the consumable material comprising:
at least one polymer comprising:
at least one compound of formula (I), especially at least one compound of formula (Ia) and/or (Ib).

In addition, the present invention is directed to a consumable assembly for use in an extrusion-based additive manufacturing system, the consumable assembly comprising:
a container portion;
a consumable filament at least partially retained by the container portion, the consumable filament comprising:
at least one polymer,
at least one compound of formula (I), especially at least one compound of formula (Ia) and/or (Ib).

The consumable filament may have a core comprising the at least one polymer and a coating comprising the at least one compound of formula (I) (WO2015130401).

The at least one polymer may be a meltable polymer which is selected from the group consisting of polyurethane, polyester, polyalkylene oxide, plasticized PVC, polyamide, protein, PEEK, PEAK, polypropylene, polyethylene, thermoplastic elastomer, POM, polyacrylate, polycarbonate, polymethylmethacrylate, polystyrene or a combination of at least two of these.

A process for producing an article by means of an additive manufacturing method from the consumable material comprises at least temporarily exposing the consumable material to infrared radiation in the wavelength range between 600 nm and 1700 nm.

The present invention is also directed to an article obtainable by the process.

In a further aspect, the invention provides a printing ink formulation for security printing, comprising the compound of the formula (I) as defined above.

In a specific embodiment the printing ink formulation, for security printing, comprises a) the compound of the formula (I) as defined above, b) a polymeric binder, c) a solvent, d) optionally at least one colorant, and e) optionally at least one further additive.

More specific the printing ink formulation comprises a) 0.0001 to 25% by weight of at least one compound of the formula (I) as defined above, b) 5 to 74% by weight of at least one polymeric binder, c) 1 to 94.9999% by weight of at least one solvent, d) 0 to 25% by weight of at least one colorant, and e) 0 to 25% by weight of at least one further additive, wherein the sum of components a) to e) adds up to 100%.

Also an aspect of the invention is a process for the manufacture of a security document comprising the steps of printing on a substrate a printing ink formulation as described above.

In another aspect, the invention provides a security document, comprising a substrate and the compound of the formula (I) as defined above. The security document may be a bank note, a passport, a check, a voucher, an ID- or transaction card, a stamp and a tax label.

Yet in a further aspect, the invention provides a security document, obtainable by a printing process, wherein a printing ink formulation is employed that comprises the compound of the formula (I) as defined above.

The IR absorber of formula (I) can also be used in the form of a mixture, comprising at least one compound of the general formula (I) and at least one further IR absorber different from compounds of the general formula (I). Suitable further IR absorbers are in principle all known classes of IR absorbers that are compatible with the compounds of the general formula (I). Preferred further IR absorbers are selected from polymethines, phthalocyanines, quinonediimmonium salts, aminium salts, rylenes, inorganic IR absorbers and mixtures thereof. Further polymethine IR absorbers are preferably selected from cyanines, squaraines, croconaines and mixtures thereof. Further inorganic IR absorbers are preferably selected from indium tin oxide, antimony tin oxide, lanthanum hexaboride, tungsten bronzes, copper salts etc.

The mixture may comprise at least one compound of the general formula (I) and at least one further compound of the general formula (II), such as, for example, a compound of formula

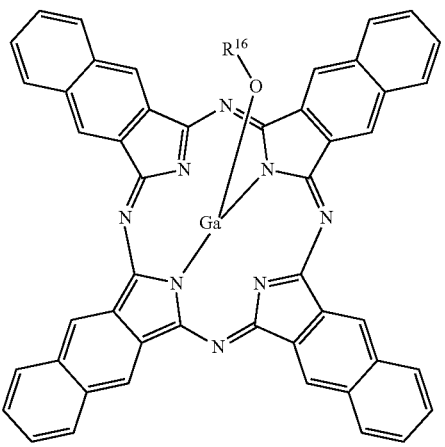

(Ib')

and a compound of formula

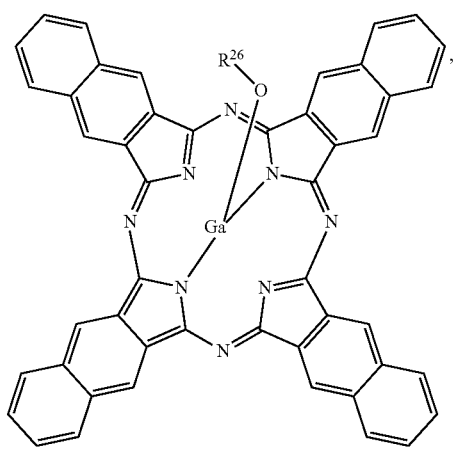

(IIb'), wherein $R^{16}$ is a group of formula $(CH_2CH_2O)_{n1}CH_2CH_2R^{19}$, $R^{26}$ is $(CH_2CH_2O)_n CH_2CH_2R^{29}$, wherein $R^{19}$ is OH, $R^{29}$ is $OCH_3$ and n1 is equal to n4.

The IR absorbers can be generally used in a concentration of from 10 ppm to 25%, preferably 100 ppm to 10%, depending on the chosen application.

The afore-mentioned IR absorbers of the formula (I) and IR absorber mixtures are especially suitable for security printing.

Security printing is the field that deals with the printing of items such as currency, passports, tamper-evident labels, stock certificates, postage stamps, identity cards, etc. The main goal of security printing is to prevent forgery, tampering or counterfeiting.

In the field of automated banknote processing, IR-absorption plays an important role. Most of the actually circulating currency carries not only visibly coloured printings, but also specific features which are only detectable in the infrared part of the spectrum. Generally, these IR-features are implemented for use by automatic currency processing equipment, in banking and vending applications (automatic teller machines, automatic vending machines, etc.), in order to recognize a determined currency bill and to verify its authenticity, in particular to discriminate it from replicas made by colour copiers.

All security documents are required to have good stability and durability. In the case of bank notes, these requirements are extreme, as bank notes are subjected to toughest use conditions by the public—they are subjected to material stress by folding, crumpling etc., subjected to abrasion, exposed to weather, exposed to bodily fluids such as perspiration, laundered, dry-cleaned, ironed etc.—and, after having been subjected to this, are expected to be as legible as when they started. Furthermore, it is essential that the documents nevertheless should have a reasonable life time, ideally of some years, despite suffering the afore-mentioned conditions. During this time, the documents, and thus the inks on them (including invisible security markings), should be resistant to fading or colour change. Hence, any ink used in a security printing process should, when cured, be robust, water-resistant, resistant to various chemicals and flexible. Moreover, as certain states are moving away from the use of paper as the substrate for bank notes, the employed printing ink formulations should be useable on plastics as well as paper.

In one aspect the present invention is directed to the use of compound of the formula (I) for security printing, especially security printing of bank notes. The compound of formula (I) may exhibit improved resistance against chemicals and solvents as well as high light stability, particularly against UV light.

Advantageously, the compound of the formula (I) may be used in a printing ink formulation for security printing to improve the fastness properties of the obtained print, in particular to improve the fastness to UV-light, chemicals, solvents and/or boiling water, without sacrificing the desired IR absorption properties.

In security printing, the compound of formula (I) is added to a printing ink formulation. Suitable printing inks are water-based, oil-based or solvent-based printing inks, based on pigment or dye, for inkjet printing, flexographic printing, screen printing, intaglio printing, offset printing, laser printing or letterpress printing and for use in electrophotography. Printing inks for these printing processes usually comprise solvents, binders, and also various additives, such as plasticizers, antistatic agents or waxes. Printing inks for offset printing and letterpress printing are usually formulated as high-viscosity paste printing inks, whereas printing inks for flexographic printing and intaglio printing are usually formulated as liquid printing inks with comparatively low viscosity.

In the context of the present invention, the expression "printing ink" also encompasses formulations that in addition to at least one IR absorber of the general formula (I) comprise a colorant. The expression "printing ink" also encompasses printing lacquers that comprise no colorant.

Suitable components of printing inks are conventional and are well known to those skilled in the art. Examples of such components are described in "Printing Ink Manual", fourth edition, Leach R. H. et al. (eds.), Van Nostrand Reinhold, Wokingham, (1988). Details of printing inks and their formulation are also disclosed in "Printing Inks"—Ullmann's Encyclopedia of Industrial Chemistry, Sixth Edition, 1999 Electronic Release. A formulation of an IR-absorbing intaglio ink formulation is described in US 20080241492 A1. The disclosure of the afore-mentioned documents is incorporated herein by reference.

The printing ink formulation according to the invention contains in general from 0.0001 to 25% by weight, preferably from 0.001 to 15% by weight, in particular from 0.1 to 10% by weight, based on the total weight of the printing ink formulation, of the compound of formula (I), component a).

The compound of formula (I) is present in the printing ink formulation in dissolved form or in solid form (in a finely divided state). Due to their pigment properties the solid form is preferred.

The printing ink formulation according to the invention contains in general from 5 to 74% by weight, preferably from 10 to 60% by weight, more preferably from 10 to 30% by weight, based on the total weight of the printing ink formulation, of component b).

Suitable polymeric binders b) for the printing ink formulation according to the invention are for example selected from natural resins, phenol resin, phenol-modified resins, alkyd resins, polystyrene homo- and copolymers, terpene resins, silicone resins, polyurethane resins, urea-formaldehyde resins, melamine resins, polyamide resins, polyacrylates, polymethacrylates, chlorinated rubber, vinyl ester resins, acrylic resins, epoxy resins, nitrocellulose, hydrocarbon resins, cellulose acetate, and mixtures thereof.

The printing ink formulation according to the invention can also comprise components that form a polymeric binder by a curing process. Thus, the printing ink formulation according to the invention can also be formulated to be energy-curable, e.g. able to be cured by UV light or EB (electron beam) radiation. In this embodiment, the binder comprises one or more curable monomers and/oligomers. Corresponding formulations are known in the art and can be found in standard textbooks such as the series "Chemistry & Technology of UV & EB Formulation for Coatings, Inks & Paints", published in 7 volumes in 1997-1998 by John Wiley & Sons in association with SITA Technology Limited.

Suitable monomers and oligomers (also referred to as prepolymers) include epoxy acrylates, acrylated oils, urethane acrylates, polyester acrylates, silicone acrylates, acrylated amines, and acrylic saturated resins. Further details and examples are given in "Chemistry & Technology of UV & EB Formulation for Coatings, Inks & Paints", Volume II: Prepolymers & Reactive Diluents, edited by G Webster.

If a curable polymeric binder is employed, it may contain reactive diluents, i.e. monomers which act as a solvent and which upon curing are incorporated into the polymeric binder. Reactive monomers are typically chosen from acrylates or methacrylates, and can be monofunctional or multifunctional. Examples of multifunctional monomers include polyester acrylates or methacrylates, polyol acrylates or methacrylates, and polyether acrylates or methacrylates.

In the case of printing ink formulations to be cured by UV radiation, it is usually necessary to include at least one photoinitiator to initiate the curing reaction of the monomers upon exposure to UV radiation. Examples of useful photoinitiators can be found in standard textbooks such as "Chemistry & Technology of UV & EB Formulation for Coatings, Inks & Paints", Volume III, "Photoinitiators for Free Radical Cationic and Anionic Polymerisation", 2nd edition, by J. V. Crivello & K. Dietliker, edited by G. Bradley and published in 1998 by John Wiley & Sons in association with SITA Technology Limited. It may also be advantageous to include a sensitizer in conjunction with the photoinitiator in order to achieve efficient curing.

The printing ink formulation according to the invention contains in general from 1 to 94.9999% by weight, preferably from 5 to 90% by weight, in particular from 10 to 85% by weight, based on the total weight of the printing ink formulation, of a solvent c).

Suitable solvents are selected from water, organic solvents and mixtures thereof. For the purpose of the invention, reactive monomers which also act as solvents are regarded as part of the afore-mentioned binder component b).

Examples of solvents comprise water; alcohols, e.g. ethanol, 1-propanol, 2-propanol, ethylene glycol, propylene glycol, diethylene glycol and ethoxy propanol; esters, e.g. ethyl acetate, isopropyl acetate, n-propyl acetate and n-butyl acetate; hydrocarbons, e.g. toluene, xylene, mineral oils and vegetable oils, and mixtures thereof.

The printing ink formulation according to the invention may contain an additional colorant d). Preferably, the printing ink formulation contains from 0 to 25% by weight, more preferably from 0.1 to 20% by weight, in particular from 1 to 15% by weight, based on the total weight of the printing ink formulation, of a colorant d).

Suitable colorants d) are selected conventional dyes and in particular conventional pigments. The term "pigment" is used in the context of this invention comprehensively to identify all pigments and fillers, examples being colour pigments, white pigments, and inorganic fillers. These include inorganic white pigments, such as titanium dioxide, preferably in the rutile form, barium sulfate, zinc oxide, zinc sulfide, basic lead carbonate, antimony trioxide, lithopones (zinc sulfide+barium sulfate), or coloured pigments, examples being iron oxides, carbon black, graphite, zinc yellow, zinc green, ultramarine, manganese black, antimony black, manganese violet, Paris blue or Schweinfurt green. Besides the inorganic pigments the printing ink formulation of the invention may also comprise organic colour pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions. Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc.

The printing ink formulation according to the invention may contain at least one additive e). Preferably, the printing ink formulation contains from 0 to 25% by weight, more preferably from 0.1 to 20% by weight, in particular from 1 to 15% by weight, based on the total weight of the printing ink formulation, of at least one component e).

Suitable additives (component e)) are selected from plasticizers, waxes, siccatives, antistatic agents, chelators, antioxidants, stabilizers, adhesion promoters, surfactants, flow control agents, defoamers, biocides, thickeners, etc. and combinations thereof. These additives serve in particular for fine adjustment of the application-related properties of the printing ink, examples being adhesion, abrasion resistance, drying rate, or slip.

The printing ink formulations according to the invention are advantageously prepared in a conventional manner, for example by mixing the individual components. As mentioned earlier, the compound of formula (I) is present in the printing ink formulations in a dissolved or finely divided solid form. Additional colorants may be employed in the printing ink formulation of the invention or in a separate ink formulation. When additional colorants are to be employed in a separate formulation, the time of application of the printing ink formulation according to the invention is usually immaterial. The printing ink formulation according to the invention can for example be applied first and then be overprinted with conventional printing inks. But it is also possible to reverse this sequence or, alternatively, to apply the printing ink formulation according to the invention in a mixture with conventional printing inks. In every case the prints are readable with suitable light sources.

Primers can be applied prior to the printing ink formulation according to the invention. By way of example, the primers are applied in order to improve adhesion to the substrate. It is also possible to apply additional printing lacquers, e.g. in the form of a covering to protect the printed image. Additional printing lacquers may also be applied to serve aesthetic purposes, or serve to control application-related properties. By way of example, suitably formulated additional printing lacquers can be used to influence the roughness of the surface of the substrate, the electrical properties, or the water-vapour-condensation properties. Printing lacquers are usually applied in-line by means of a lacquering system on the printing machine employed for printing the printing ink formulation according to the invention.

The printing ink formulations according to the invention are also suitable for use in multilayer materials. Multilayer materials are e.g. composed of two or more plastics foils, such as polyolefin foils, metal foils, or metallised plastics foils, which are bonded to one another, by way of example, via lamination or with the aid of suitable laminating adhesives. These composites may also comprise other functional layers, such as odour-barrier layers or water-vapour barriers.

The printing ink formulations may additionally comprise one or more UV absorbers. UV absorbers are well known in the plastics, coatings and cosmetic industry. Examples for suitable UV absorbers are subsequently given.

2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-ditert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl, 2-[2'-hydroxy-3'-(α,α-dimethylbenzyl)-5'-(1,1,3, 3-tetramethylbutyl)-phenyl]benzotriazole; 2-[2'-hydroxy-3'-(1,1,3,3-tetramethylbutyl)-5'-(α,α-dimethylbenzyl)-phenyl] benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates, for example ethyl α-cyano-β,β-diphenylacrylate, isooctyl α-cyano-β,β-diphenylacrylate, methyl α-carbomethoxycinnamate, methyl α-cyano-β-methyl-β-methoxycinnamate, butyl α-cyano-β-methyl-β-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3, 5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1, 3,5-triazine.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Unless otherwise indicated in the following examples and elsewhere in the specification and claims, all parts and percentages are by weight, temperatures are in degrees centigrade and pressures are at or near atmospheric.

EXAMPLES

Example 1

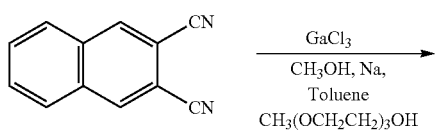

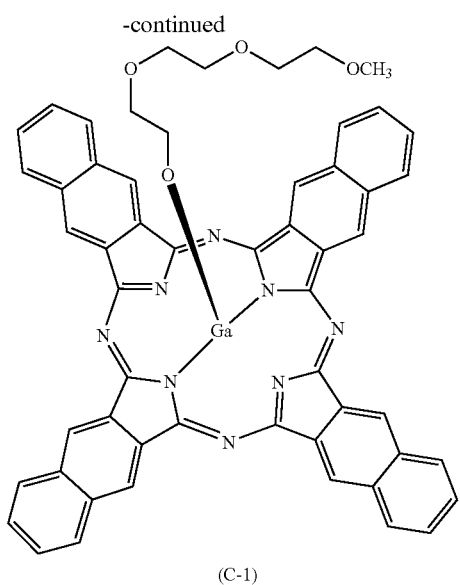

(C-1)

a) 1-[2-[2-(2-Methoxyethoxy)ethoxy]ethoxy] Ga-naphthalocyanine (C-1)

6.2 g sodium are dissolved in 200 g methanol and slowly added to a solution of 15.0 g gallium chloride in 250 g toluene at room temperature. To the resulting suspension is added a mixture of 62 g naphthalene-2,3-dicarbonitrile, 240 g triethyleneglycol-monomethylether and 240 g toluene. Toluene and the excess of methanol are distilled off under reduced pressure and the reaction mixture is stirred at 170° C. for 5 hours. The suspension is cooled to 80° C., 250 g DMF is added and then further cooled to room temperature. The green solid is collected by filtration, successively washed with DMF, acetone and water and then dried (yield: 41 g; dark green powder).

b) 3-[3-[4-[1-[4-(2,3-Dihydroxypropoxy)phenyl]-1-methyl-ethyl]phenoxy]-2-hydroxy-propoxy] Ga-naphthalocyanine (1h)

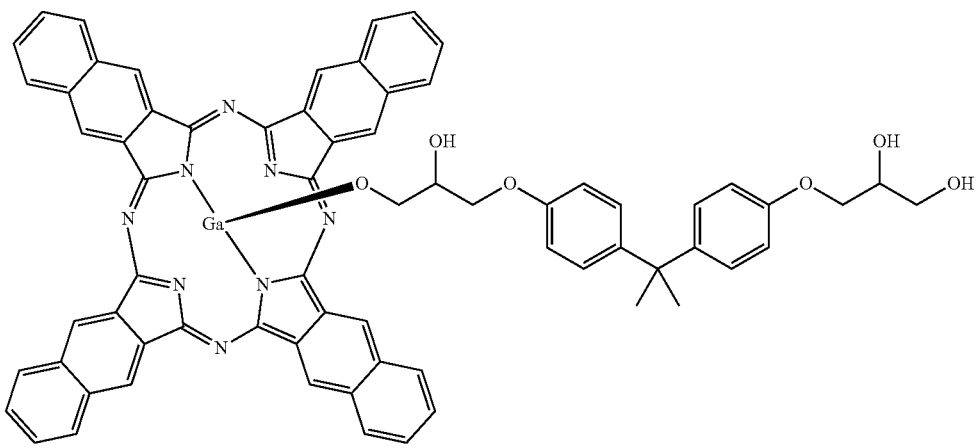

(1h)

5 g of cpd. (C-1) and 15 g 3-[4-[1-[4-(2,3-dihydroxy-propoxy)phenyl]-1-methylethyl]phenoxy]propane-1,2-diol are mixed under nitrogen atmosphere and under stirring slowly heated up to 150° C. The mixture is kept at that temperature for 18 hours, then allowed to cool down. DMF and water are added and the remaining dark green solid is separated by filtration, washed successively with DMF, acetone and water and dried over night at 60° C. in an oven under vacuum (yield 5.3 g; dark green powder).

Example 2

The reaction is carried out in a kneader with 50 g cpd. (C-1), 175 g sodium chloride and 60 g 3-[4-[1-[4-(2,3-dihydroxypropoxy)phenyl]-1-methyl-ethyl]phenoxy]propane-1,2-diol. The compounds are added subsequently at room temperature. Kneading is carried out for 6 hours and at room temperature and then the mixture is slowly heated up to 90° C. After continuing for 6 hours, the mixture is cooled down, 1 L of deionized water is added and mixing is continued for one more hour. Then the mixture is filtrated, washed with 6 L of deionized water, DMF, acetone and again with water and dried in an oven (yield: 59 g; dark green powder).

Example 2b

A paddle dryer is charged with 100 g of cpd. (C-1), under slow stirring and nitrogen atmosphere. 120 g of 3-[4-[1-[4-(2,3-dihydroxypropoxy)phenyl]-1-methyl-ethyl]phenoxy]

propane-1,2-diol is added in portions so that a homogeneous mixture is obtained. The mixture then is heated up to 120° C. and kept at that temperature for 8 hours. After cooling down water is added, the residue separated by filtration, subsequently washed with DMF, acetone and water and dried in an oven at 60° C. (yield: 98 g; dark green powder).

Molecular Formula: $C_{69}H_{51}GaN_8O_6$; MW: 1157.9 g/mol
Exact Mass calc.: 1156.3, Exact mass meas. (Maldi) 1156.1

The procedures described above lead to the desired compounds as the main product. Mixtures of reaction product having a higher content of starting material can be obtained by shortening the reaction time and/or lowering the reaction temperature.

Example 3

3-[2-(2-hydroxyethylamino)ethoxy] Ga-naphthalocyanine (1g)

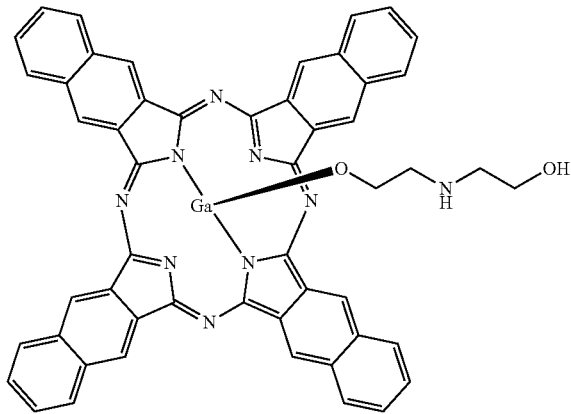

5 g cpd. (C-1) and 15 g diethanolamine are stirred under nitrogen atmosphere and slowly heated up to 150° C. The mixture is kept at that temperature for 18 hours, then allowed to cool down. DMF and water are added and the remaining dark green solid is separated by filtration, washed successively with DMF, acetone and water and dried over night at 60° C. in an oven under vacuum (yield: 4.0 g; dark green powder). Alternatively, compound (1g) can be obtained in a similar way as described in Examples 2a and 2b.

Molecular Formula: $C_{52}H_{34}GaN_9O_2$; MW: 886.61 g/mol
Exact Mass calc.: 885.21, Exact mass meas. (Maldi) 885.8

Example 4

Example 2 is repeated, except that 3-[4-[1-[4-(2,3-dihydroxypropoxy)phenyl]-1-methylethyl]phenoxy]propane-1, 2-diol is replaced by $HO(CH_2CH_2O)_3H$. The obtained particles of compound (1c) have a number average particle size of 30 nm with standard deviation being less than 20%. The particle size is measured with transmission electron microscopy (TEM).

TEM analysis of dispersions was performed on "Libra 120", an instrument from ZEISS in bright field mode at an electron beam acceleration voltage of 120 kV. The TEM was used with an energy filter for better contrast. At least 2 representative images with scale in different magnification were recorded in order to characterize the dominate particle morphology for each sample. The minimal feret diameter of the particles was determined with the software "ImageJ", which is based on the measurement of at least 4800 randomly selected particles.

The compounds listed in the table below can be obtained as described above:

| Starting Material | Reagent | Product | Formula | Formula Weight (g/mol) | Exact Mass calc. | Mass meas. (MALDI) |
|---|---|---|---|---|---|---|
| (C-1) | $HOCH_2CH(OH)CH_2OH$ | 1j | $C_{51}H_{31}GaN_8O_3$ | 873.57 | 872.18 | 872.6 |
| (C-1) | $HO(CH_2CH_2O)_2H$ | 1b | $C_{52}H_{33}GaN_8O_3$ | 887.59 | 886.19 | 886.6 |
| (C-1) | $HOCH_2CH_2OH$ | 1a | $C_{50}H_{29}GaN_8O_2$ | 843.54 | 842.17 | 842.3 |
| (C-1) | $HO(CH_2CH_2O)_3H$ | 1c | $C_{54}H_{37}GaN_8O_4$ | 931.65 | 930.22 | 930.6 |
| (C-1) | $HOCH_2CH(CH_3)OH$ | 1l | $C_{51}H_{31}GaN_8O_2$ | 857.57 | 856.18 | 856.6 |
| (C-2) | $HO(CH_2CH_2O)_3H$ | 2c | $C_{54}H_{37}AlN_8O_4$ | 888.9 | 888.28 | 888.6 |
| (C-2) | $HO(CH_2CH_2O)_2H$ | 2b | $C_{52}H_{33}AlN_8O_3$ | 844.85 | 844.25 | 844.4 |

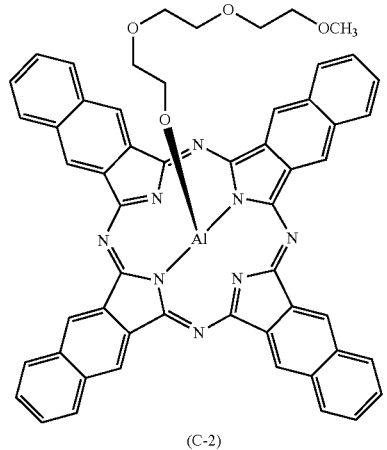

(C-2)

Polypropylene glycol, $H[OCH(CH_3)CH_2]_{n1}$, n1 approx. 7, with an average molecular weight of 425 or polysorbate 20 can also be introduced as axial ligands according to the procedures described above. Products are not uniform because the reagents are mixtures:

| Starting Material | Reagent | Product | Formula | Formula Weight (g/mol) | Exact Mass calc. | Mass meas. (MALDI) |
|---|---|---|---|---|---|---|
| (C-1) | Polypropylene glycol (average Mn ~425; CAS 25322-69-4 $H[OCH(CH_3)CH_2]_{n1}OH$ n1~7) | 1k | Approx. $C_{69}H_{67}GaN_8O_8$ | Approx. 1206.04 | n.a. | n.a. |
| (C-1) | Polysorbate 20 1227.72 g · mol − 1 CAS 9005-64-5 | 1i | Approx. $C_{106}H_{137}GaN_8O_{26}$ | Approx. 2008.98 | n.a. | n.a. |

Offset Printing Procedure

An offset ink is prepared by mixing the following components by means of an automatic pigment muller:

| | |
|---|---|
| Offset varnish | 2000 mg |
| IR absorber, prepared as described above | 40 mg |
| Siccative | 20 mg |

Immediately afterwards the freshly prepared offset ink is printed onto cotton paper with a printability tester (IGT Orange Proofer).

The remission then is measured with the help of a spectrophotometer.

| Product | Lambda at min. Remission | Min. Remission % |
|---|---|---|
| 1a | 755 | 24.99 |
| 1b | 760 | 56.30 |
| 1c | 750 | 36.19 |
| 1g | 805 | 71.94 |
| 1i | 750 | 46.34 |
| 1j | 750 | 27.43 |
| 1k | 750 | 31.41 |
| 2b | 790 | 72.35 |

The invention claimed is:

1. A printing ink formulation, comprising a compound of formula

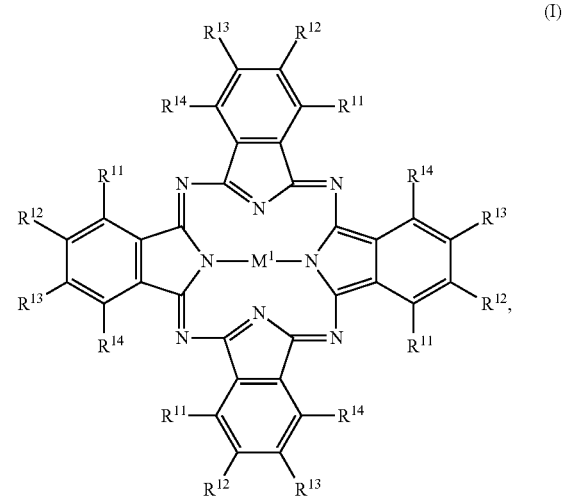

(I)

wherein $M^1$ is $Al(R^{15})$, or $Ga(R^{15})$, $R^{15}$ is $OR^{16}$;

$R^{11}$ and $R^{14}$ are independently of each other H, F, $OR^{17''}$, $SR^{17''}$, or $NR^{17}R^{17'}$, $R^{12}$ and $R^{13}$ are independently of each other H, F, $OR^{17''}$, $SR^{17''}$, $NHR^{17}$, or $NR^{17}R^{17'}$, or $R^{12}$ and $R^{13}$ together with the C atoms to which they are bonded form a 6-membered aromatic ring, which may optionally be substituted, $R^{16}$ is a group of formula

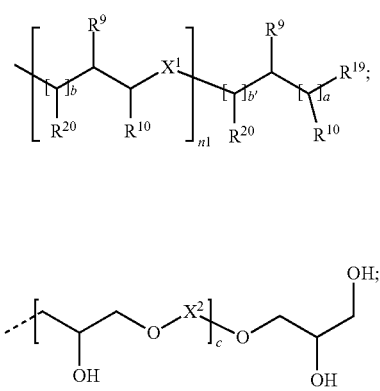

(Va)

(Vb)

or

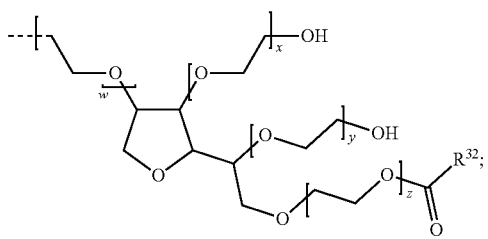

(Vc)

$X^1$ is O, S or NH,
$X^2$ is

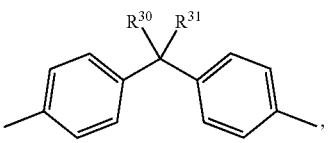

w+x+y+z=4 to 20;
$R^9$ and $R^{10}$ are the same or different and are each independently hydrogen, or a methyl group;
$R^{17}$, $R^{17'}$ and $R^{17''}$ are independently of each other a $C_1$-$C_{12}$alkyl group, $(CH_2CH_2O)_nOR^{18}$, or phenyl; or
$R^{17}$ and $R^{17'}$ together with the C atoms to which they are bonded form together a 5- or 6-membered saturated N-heterocyclic ring, which is optionally substituted by 1 or 2 methyl groups;
$R^{18}$ is a $C_1$-$C_{12}$alkyl group;
$R^{19}$ is OH, or $NH_2$;
$R^{20}$ is H, or a $C_1$-$C_4$alkyl group;
$R^{30}$ and $R^{31}$ are independently of each other hydrogen, or a $C_1$-$C_4$alkyl group; or
$R^{30}$ and $R^{31}$ form a five, or six-membered ring, which may optionally be substituted,
$R^{32}$ is a $C_1$-$C_{25}$alkyl group, or a $C_2$-$C_{25}$alkenyl group,
a is 0, or 1; b is 0, or 1; b' is 0, or 1; c is 1;
n is 0, 1, 2, 3 or 4; and
n1 is 0, or a value from 1 to 10.

2. The printing ink formulation according to claim 1, which is a compound of formula

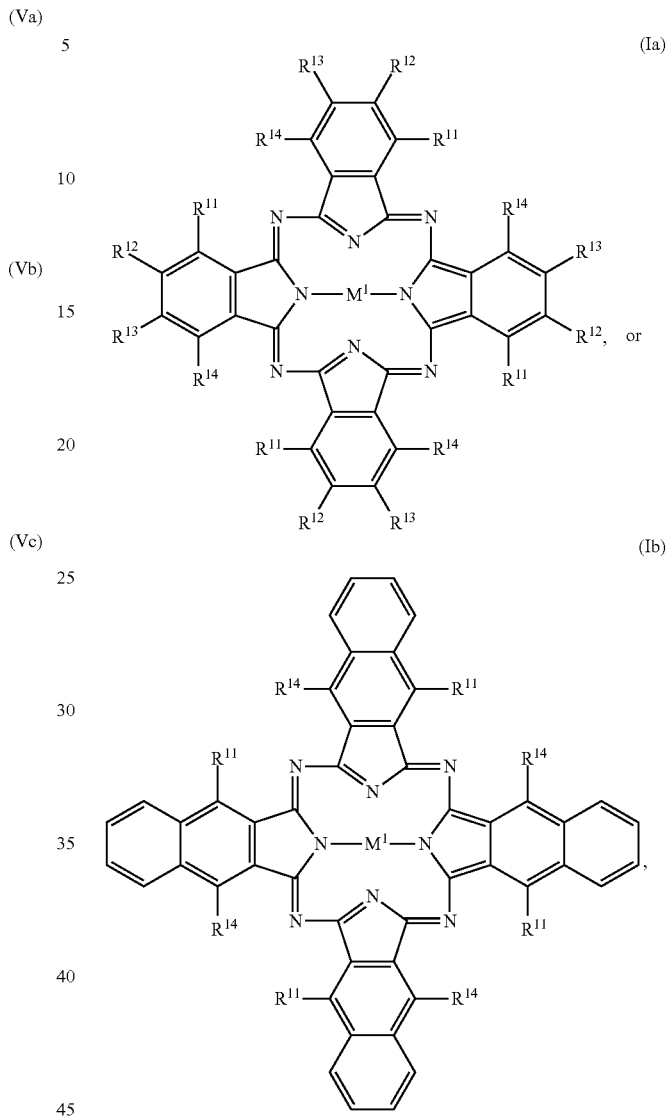

wherein
$R^{12}$ and $R^{13}$ are independently of each other H, F, $OR^{17''}$, $SR^{17''}$, $NHR^{17}$, or $NR^{17}R^{17'}$, and $M^1$, $R^{11}$, $R^{14}$, $R^{17}$, $R^{17'}$ and $R^{17''}$ are defined in claim 1.

3. The printing ink formulation according to claim 1, wherein in the compound of formula (Ib) $R^{11}$ and $R^{14}$ are H.

4. The printing ink formulation according to claim 1, wherein in the compound of formula (Ia) $R^{11}$, $R^{12}$, $R^{13}$ and $R^{14}$ are H.

5. The printing ink formulation according to claim 1, which is a compound

| Cpd. | $R^{16}$ |
|---|---|
| 1a | $CH_2CH_2OH$ |
| 1b | $(CH_2CH_2O)_2H$ |
| 1c | $(CH_2CH_2O)_3H$ |
| 1d | $CH_2CH(CH_3)OH$ |
| 1e | $(CH_2CH(CH_3)O)_2H$ |
| 1f | $(CH_2CH(CH_3)O)_3H$ |

-continued

| Cpd. | R¹⁶ |
|---|---|
| 1g | CH₂CH₂NHCH₂CH₂OH |
| 1h | 1) |
| 1i | 2) |
| 1j | CH₂CH(OH)CH₂OH |
| 1k | (CH₂CH(CH₃)O)$_{n1}$H (n1 is 7) |
| 1l | CH₂CH₂CH₂OH |

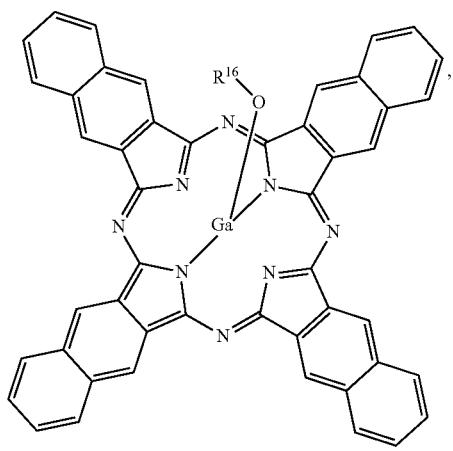

(Ib′)

| Cpd. | R¹⁶ |
|---|---|
| 2a | CH₂CH₂OH |
| 2b | (CH₂CH₂O)₂H |
| 2c | (CH₂CH₂O)₃H |
| 2d | CH₂CH(CH₃)OH |
| 2e | (CH₂CH(CH₃)O)₂H |
| 2f | (CH₂CH(CH₃)O)₃H |
| 2g | CH₂CH₂NHCH₂CH₂OH |
| 2h | 1) |
| 2i | 2) |
| 2j | CH₂CH(OH)CH₂OH |
| 2k | (CH₂CH(CH₃)O)$_{n1}$H (n1 is 7) |
| 2l | CH₂CH₂CH₂OH |

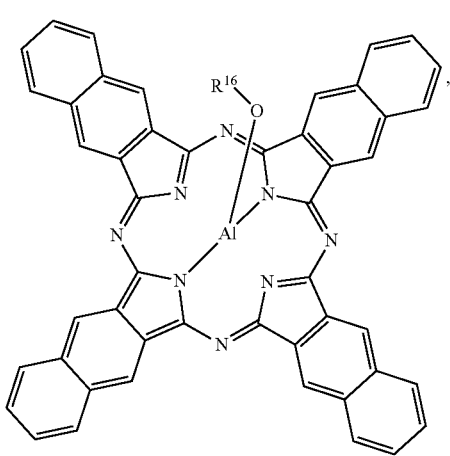

(Ib″)

| Cpd. | R¹⁶ |
|---|---|
| 3a | CH₂CH₂OH |
| 3b | (CH₂CH₂O)₂H |
| 3c | (CH₂CH₂O)₃OH |
| 3d | CH₂CH(CH₃)OH |
| 3e | (CH₂CH(CH₃)O)₂H |
| 3f | (CH₂CH(CH₃)O)₃H |
| 3g | CH₂CH₂NHCH₂CH₂OH |
| 3h | 1) |
| 3i | 2) |
| 3j | CH₂CH(OH)CH₂OH |
| 3k | (CH₂CH(CH₃)O)$_{n1}$H (n1 is 7) |
| 3l | CH₂CH₂CH₂OH |

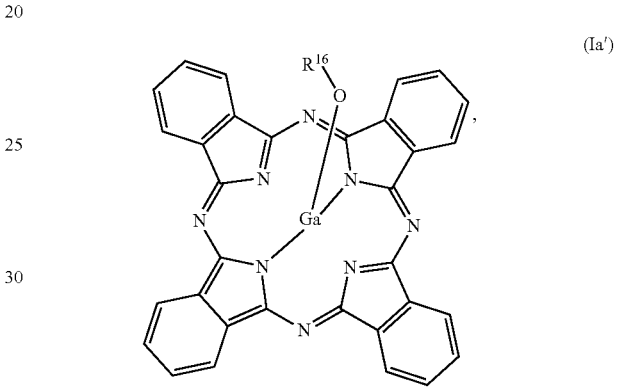

(Ia′)

| Cpd. | R¹⁶ |
|---|---|
| 4a | CH₂CH₂OH |
| 4b | (CH₂CH₂O)₂H |
| 4c | (CH₂CH₂O)₃H |
| 4d | CH₂CH(CH₃)OH |
| 4e | (CH₂CH(CH₃)O)₂H |
| 4f | (CH₂CH(CH₃)O)₃H |
| 4g | CH₂CH₂NHCH₂CH₂OH |
| 4h | 1) |
| 4i | 2) |
| 4j | CH₂CH(OH)CH₂OH |
| 4k | (CH₂CH(CH₃)O)$_{n1}$H (n1 is 7) |
| 4l | CH₂CH₂CH₂OH |

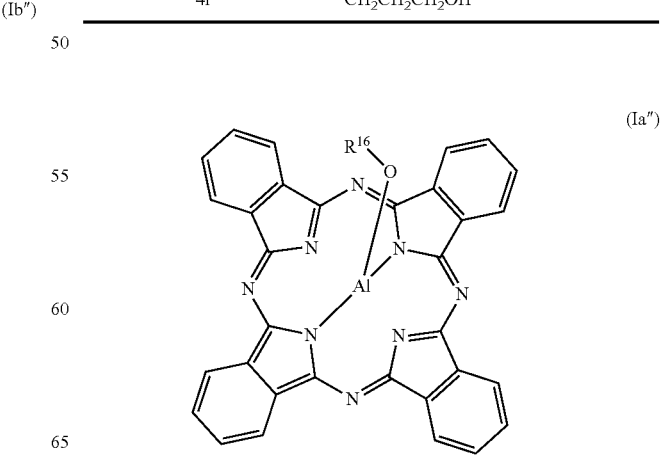

(Ia″)

1) $R^{16}$ is

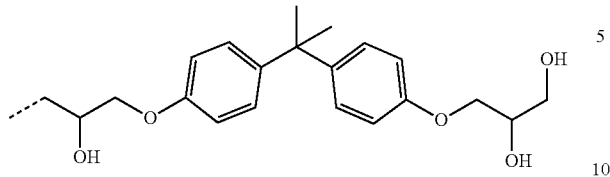

2) $R^{16}$ is,

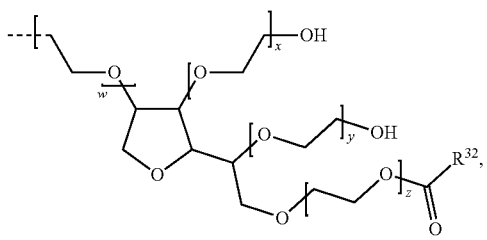
(Vc)

wherein
w+x+y+z=20 and $R^{32}$ is $(CH_2)_{10}CH_3$, $(CH_2)_{12}CH_3$, $(CH_2)_{14}CH_3$ and $(CH_2)_{16}CH_3$.

6. The printing ink formulation according to claim 1, further comprising
   a polymeric binder, and
   a solvent.

7. The printing ink formulation according to claim 1, comprising
   a) 0.0001 to 25% by weight of the compound,
   b) 5 to 74% by weight of at least one polymeric binder,
   c) 1 to 94.9999% by weight of at least one solvent,
   d) 0 to 25% by weight of at least one colorant, and
   e) 0 to 25% by weight of at least one further additive,
   wherein the sum of components a) to e) adds up to 100%.

8. A process for the manufacture of a security document comprising the steps printing on a substrate a printing ink formulation according to claim 1.

9. The printing ink formulation of claim 6, further comprising at least one colorant.

10. The printing ink formulation of claim 6, further comprising at least one further additive.

11. An article obtained by additive manufacturing from a consumable material comprising at least one formulation according to claim 1, comprising temporarily exposing the consumable material to an infrared radiation having a wavelength range between 600 nm and 1700 nm.

12. A security document, comprising a substrate and at least one compound of formula

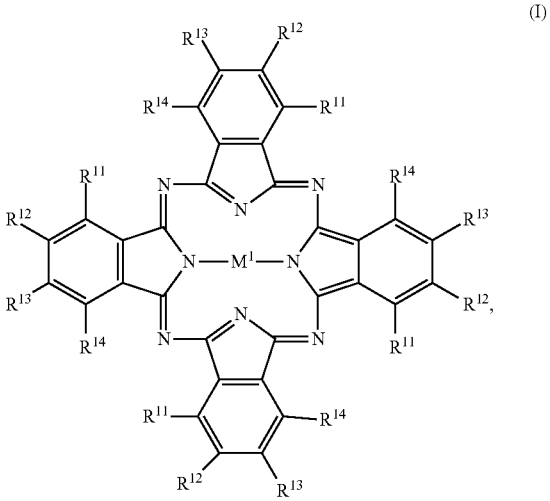
(I)

wherein
$M^1$ is $Al(R^{15})$, or $Ga(R^{15})$,
$R^{15}$ is $OR^{16}$;
$R^{11}$ and $R^{14}$ are independently of each other H, F, $OR^{17"}$, $SR^{17"}$, or $NR^{17}R^{17'}$,
$R^{12}$ and $R^{13}$ are independently of each other H, F, $OR^{17"}$, $SR^{17"}$, $NHR^{17}$, or $NR^{17}R^{17'}$ or $R^{12}$ and $R^{13}$ together with the C atoms to which they are bonded form a 6-membered aromatic ring, which may optionally be substituted,
$R^{16}$ is a group of formula

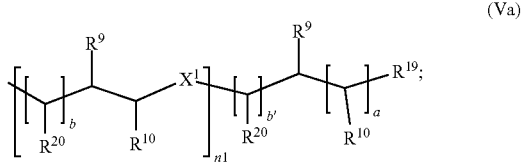
(Va)

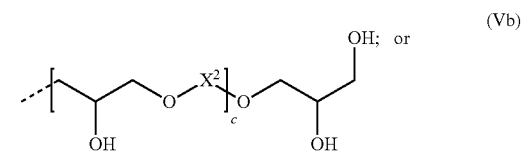
(Vb)

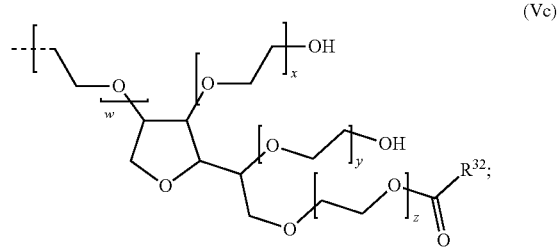
(Vc)

$X^1$ is O, S or NH, $X^2$ is

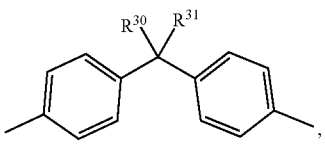

w+x+y+z=4 to 20;

$R^9$ and $R^{10}$ are the same or different and are each independently hydrogen, or a methyl group;

$R^{17}$, $R^{17'}$ and $R^{17''}$ are independently of each other a $C_1$-$C_{12}$alkyl group, $(CH_2CH_2O)_nOR^{18}$, or phenyl; or $R^{17}$ and $R^{17'}$ together with the C atoms to which they are bonded form together a 5- or 6-membered saturated N-heterocyclic ring, which is optionally substituted by 1 or 2 methyl groups;

$R^{18}$ is a $C_1$-$C_{12}$alkyl group;

$R^{19}$ is OH, or $NH_2$;

$R^{20}$ is H, or a $C_1$-$C_4$alkyl group;

$R^{30}$ and $R^{31}$ are independently of each other hydrogen, or a $C_1$-$C_4$alkyl group; or $R^{30}$ and $R^{31}$ form a five, or six-membered ring, which may optionally be substituted, $R^{32}$ is a $C_1$-$C_{25}$alkyl group, or a $C_2$-$C_{25}$alkenyl group, a is 0, or 1; b is 0, or 1; b' is 0, or 1; c is 1;

n is 0, 1, 2, 3 or 4; and n1 is 0, or a value from 1 to 10.

13. The security document according to claim 12, which is selected from a bank note, a passport, a check, a voucher, an ID- or transaction card, a stamp and a tax label.

14. A process for the production of a compound of formula

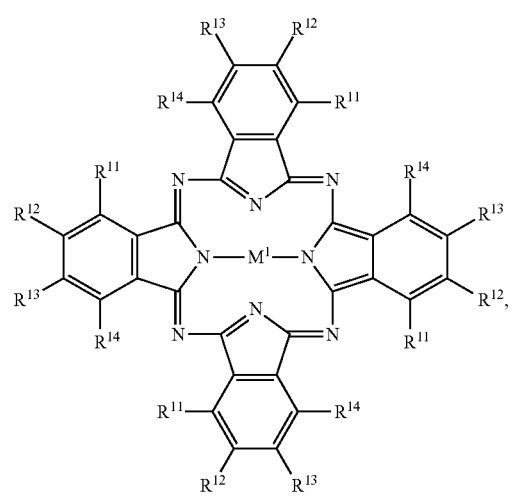

comprising a) providing a suspension of a compound of formula

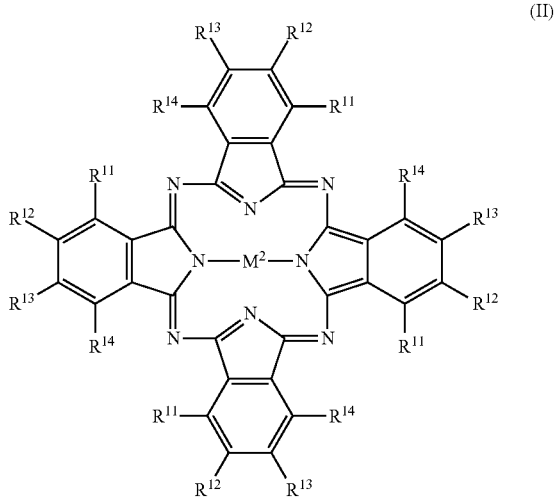

in a compound of formula $HOR^{16}$ (III);

b) reacting the compound of formula (II) with the compound of formula (III) to obtain a compound of formula (I');

wherein $M^1$ is $Al(R^{15})$, or $Ga(R^{15})$, $R^{15}$ is $OR^{16}$, $R^{16}$ is a group of formula

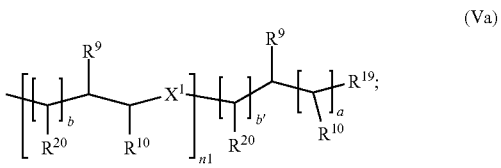

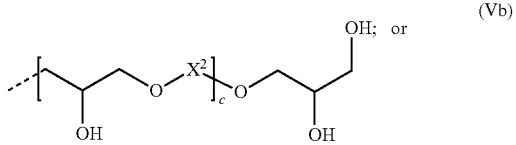

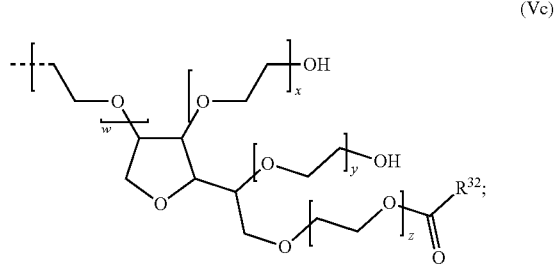

or is a $C_1$-$C_{25}$alkyl group;

$X^1$ is O, S or NH, $X^2$ is

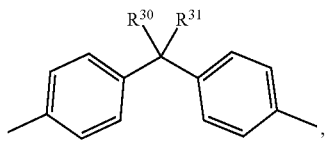

w+x+y+z=4 to 20;

$R^9$ and $R^{10}$ are the same or different and are each independently hydrogen, or a methyl group;

w+x+y+z=4 to 20;

$R^9$ and $R^{10}$ are the same or different and are each independently hydrogen, or a methyl group;

$R^{11}$ and $R^{14}$ are independently of each other H, F, $OR^{17"}$, $SR^{17"}$, or $NR^{17}R^{17'}$, $R^{12}$ and $R^{13}$ are independently of each other H, F, $OR^{17"}$, $SR^{17"}$, $NHR^{17}$, or $NR^{17}R^{17'}$, or $R^{12}$ and $R^{13}$ together with the C atoms to which they are bonded form a 6-membered aromatic ring, which may optionally be substituted, $R^{17}$, $R^{17'}$ and $R^{17"}$ are independently of each other a $C_1$-$C_{12}$alkyl group, $(CH_2CH_2O)_nOR^{18}$, or phenyl; or $R^{17}$ and $R^{17'}$ together with the C atoms to which they are bonded form together a 5- or 6-membered saturated N-heterocyclic ring, which is optionally substituted by 1 or 2 methyl groups;

$R^{18}$ is a $C_1$-$C_{12}$alkyl group;

$R^{19}$ is OH, or $NH_2$;

$R^{20}$ is H, or a $C_1$-$C_4$alkyl group;

$R^{30}$ and $R^{31}$ are independently of each other hydrogen, or a $C_1$-$C_4$alkyl group; or $R^{30}$ and $R^{31}$ form a five, or six-membered ring, which may optionally be substituted, $R^{32}$ is a $C_1$-$C_{25}$alkyl group, or a $C_2$-$C_{25}$alkenyl group, a is 0, or 1; b is 0, or 1; b' is 0, or 1; c is 1;

n is 0, 1, 2, 3 or 4; and n1 is 0, or a value from 1 to 10;

$M^2$ is $Al(R^{25})$, or $Ga(R^{25})$, $R^{25}$ is $OR^{26}$;

$R^{26}$ is $C_1$-$C_{25}$alkyl, $(CH_2CH(R^{20})O)_{n4}CH_2CH_2R^{29}$, $(CH_2CH_2CH_2O)_{n5}CH_2CH_2CH_2R^{29}$, $CH_2CH(OH)CH_2OH$, or $(CH_2CH_2NH)_{n6}CH_2CH_2R^{29}$; $(CH_2CH_2O)_{n4}CH_2CH_2R^{29}$, $(CH_2CH(CH_3)O)_{n4}CH_2CH(CH_3)R^{29}$, $(CH_2CH_2CH_2O)_{n5}CH_2CH_2CH_2R^{29}$, or $(CH_2CH_2NH)_{n6}CH_2CH_2R^{29}$;

$R^{29}$ is $OR^{30}$;

$R^{30}$ is a $C_1$-$C_{12}$alkyl group, n4, n5 and n6 are 0, 1, 2, 3 or 4; with the proviso that in case $R^{16}$ is a $C_1$-$C_{25}$alkyl group, $R^{16}$ and $R^{26}$ have different meanings, and including the compound in the printing formulation of claim 1.

15. The process according to claim 14, wherein step b) includes applying of shear forces to the suspension of the compound of formula (II) and the compound of formula (III) by stirring, kneading or any other mechanical treatment.

* * * * *